July 5, 1966 E. SINGER ETAL 3,259,886
DATA TRANSFER APPARATUS
Filed July 7, 1961 19 Sheets-Sheet 1

INVENTOR.
EDWIN SINGER
PHILIP ROSENBLATT
BY EVELYN BEREZIN WILENITZ

Curtis, Morris, & Safford
ATTORNEYS

FIG. 2.

Simplified Program to Digest Air-line Call from Message Register (MR)

| | Instruction Field Contents (Initally stored in core memory) | (ICR) | | |
|---|---|---|---|---|
| I | 99060000 | 0000 | Branch if Seeker is busy | Branch to 0000 |
| II | 26102100 | 0008 | Transfer Call number from message Register to Specified Memory Field. | Send MR Contents to 2100 to 2109 |
| III | 60002100 | 0016 | Set Up Accumulator (Transfer to ACR) | In Location 2100 |
| IV | 81012300 | 0024 | Compare | 1st Digit (2100) vs const. (2300) |
| V | 98230192 | 0032 | Branch on Inequality | Branch to 0192 |
| VI | 03132350 | 0040 | Transfer to DCR | Send Control information 2350-2362 to DCR to cause Drum Read into 3400 thru. 3419 |
| VII | 99030048 | 0048 | Branch if Drum is busy | |
| | | 0056 | | |

Instruction Field Continued

INVENTOR
EDWIN SINGER
PHILIP ROSENBLATT
EVELYN BEREZIN WILENITZ
BY Curtis, Morris & Safford
ATTORNEYS

Fig. 3a.

Register contents ar[illegible] end of indicated CCS; Processing starts at beginning of program with IF set, CCS-1, (ICR=0000)
Given 9906[illegible]00 in Core location 0-7

| | (CCS) | (IF) | (ICR) | (OSR) | (MCR-W) | Core Input/Output |
|---|---|---|---|---|---|---|
| I | 1 | Set | 0002 | 99 | XXXXXX | 99 |
| | 2 | " | 0004 | 99 | 06XXXX | 06 |
| | 3 | " | 0006 | 99 | 06XX00 | 00 |
| | 4 | " | 0008 | 99 | 060000 | 00 |
| | 1 | Reset | 0008 | " | " | |
| II | 1 | Set | 0010 | 26 | " | 26 |
| | 2 | " | 0012 | " | 10XXXX | 10 |
| | 3 | " | 0014 | " | 10XX21 | 21 |
| | 4 | " | 0016 | " | 102100 | 00 |
| | 1 | Reset | 0016 | " | " | |
| | 2 | | " | " | 092101 | 0 |
| | 2 | | " | " | 082102 | 3 |
| | 2 | | " | " | 082103 | 6 |
| | ⋮ | ⋮ | ⋮ | ⋮ | ⋮ | ⋮ |
| | 2 | " | " | " | 002109 | 1 |
| | 3 | " | " | " | " | |

Ten Consecutive Transfers from Message Register

INVENTOR
EDWIN SINGER
PHILIP ROSENBLATT
EVELYN BEREZIN WILENITZ
BY Curtis, Morris & Safford
ATTORNEYS

Fig. 3b.

| | (CCS) | (IF) | (ICR) | (OSR) | (MCR-W) | Core In/out | (ACR) |
|---|---|---|---|---|---|---|---|
| III | 1 | Set | 0018 | 60 | | 60 | XXXXXX |
| | 2 | " | 0020 | 60 | 00XXXX | 00 | XXXX00 |
| | 3 | " | 0022 | 60 | 00XX21 | 21 | XX0021 |
| | 4 | " | 0024 | " | 002100 | 00 | 002100 |
| IV | 1 | Set | 0026 | 81 | XXXXXX | 81 | " |
| | 2 | " | 0028 | " | 01XXXX | 01 | " |
| | 3 | " | 0030 | 81 | 01XX23 | 23 | " |
| | 4 | " | 0032 | " | 012300 | 00 | " |
| | 1 | Reset | " | " | | 0 | " |
| | 2 | " | " | " | 002301 | 0 | " |
| | 3 | " | " | " | " | 0 | " |
| V | 1 | Set | 0034 | 98 | XXXXXX | 98 | " |
| | 2 | " | 0036 | " | 23XXXX | 23 | " |
| | 3 | " | 0038 | " | 23XX01 | 01 | " |
| | 4 | " | | " | 230192 | 92 | " |
| | 1 | Reset | 0192 | " | " | | " |

INVENTOR
EDWIN SINGER
PHILIP ROSENBLATT
EVELYN BEREZIN WILENITZ
BY Curtis, Morris, & Safford
ATTORNEYS.

Fig. 3c.

| | | | | | | | | | |
|---|---|---|---|---|---|---|---|---|---|
| VI | 1 | Set | 0042 | 03 | XXXXXX | 03 | 002100 | Core Address | |
| | 2 | " | 0044 | 03 | 13XXXX | 13 | " | Selected | |
| | 3 | " | 0046 | 03 | 3XX23 | 23 | " | | |
| | 4 | " | 0048 | 03 | 132350 | 50 | " | | |
| | 1 | Reset | 0048 | 03 | 132350 | — | " | | |
| | 1 | " | " | " | " | — | " | | |
| | 2 | " | " | " | 122351 | 3 | " | | |
| | 2 | " | " | " | 112352 | 0 | " | | |
| | | (In CC5-2 for 13 Core Cycles) | | | | | | | |
| | 3 | " | " | " | 002362 | | " | | |
| | 3 | " | " | " | " | | " | | |
| VII | 1 | Set | 0050 | 99 | XXXXXX | 99 | " | | |
| | 2 | " | 0052 | 99 | 03XXXX | 03 | " | | |
| | 3 | " | 0054 | " | 03XX00 | 00 | " | | |
| | 4 | " | 0056 | " | 030048 | 48 | " | 0054 | |
| | 1 | Reset | 0048 | " | 030048 | — | " | — | |
| | 1 | Set | 0050 | 99 | XXXXXX | 99 | " | 0048 | |
| | 2 | " | 0052 | " | 03XXXX | 03 | " | 0050 | |
| | 2 | " | " | " | " | | " | 3400 | Interrupt cycle-1st Digit from Drum Cycle |
| | 3 | " | 0054 | " | 03XX00 | | " | 0052 | |
| | 3 | " | " | " | " | | " | 3401 | Interrupt cycle-2nd. Digit from Drum Cycle |
| | 4 | " | 0056 | " | 030048 | | " | 0054 | |

The above Branch Order will be repeated until the Drum Busy Line goes low, i.e. until twenty INTERRUPTS have been completed.

INVENTOR
EDWIN SINGER
PHILIP ROSENBLATT
EVELYN BEREZIN WILENITZ
BY
Curtis, Morris, & Safford
ATTORNEYS

INVENTOR
EDWIN SINGER
PHILIP ROSENBLATT
BY EVELYN BEREZIN WILENITZ

Curtis, Morris, & Safford
ATTORNEYS

INVENTOR.
EDWIN SINGER
PHILIP ROSENBLATT
BY EVELYN BEREZIN WILENITZ
Curtis, Morris, & Safford
ATTORNEYS INVENTOR.
EDWIN SINGER
PHILIP ROSENBLATT
EVELYN BEREZIN WILENITZ
BY
Curtis, Morris, & Safford
ATTORNEYS July 5, 1966 E. SINGER ETAL 3,259,886

DATA TRANSFER APPARATUS

Filed July 7, 1961 19 Sheets-Sheet 9

INVENTOR.
EDWIN SINGER
PHILIP ROSENBLATT
BY EVELYN BEREZIN WILENITZ

Curtis, Morris, & Safford
ATTORNEYS

INVENTOR.
EDWIN SINGER
PHILIP ROSENBLATT
BY EVELYN BEREZIN WILENITZ

Curtis, Morris, & Safford
ATTORNEYS

INVENTOR
EDWIN SINGER
PHILIP ROSENBLATT
BY EVELYN BEREZIN WILENITZ

Curtis, Morris, & Safford
ATTORNEYS

INVENTOR.
EDWIN SINGER
PHILIP ROSENBLATT
BY EVELYN BEREZIN WILENITZ
Curtis, Morris, & Safford
ATTORNEYS.

INVENTOR.
EDWIN SINGER
PHILIP ROSENBLATT
BY EVELYN BEREZIN WILENITZ
Curtis, Morris, & Safford
ATTORNEYS.

INVENTOR.
EDWIN SINGER
PHILIP ROSENBLATT
EVELYN BEREZIN WILENITZ
BY
Curtis, Morris, & Safford
ATTORNEYS

INVENTOR.
EDWIN SINGER
PHILIP ROSENBLATT
BY EVELYN BEREZIN WILENITZ

Curtis, Morris, & Safford
ATTORNEYS

INVENTOR.
EDWIN SINGER
PHILIP ROSENBLATT
BY EVELYN BEREZIN WILENITZ

Curtis, Morris, & Safford
ATTORNEYS

INVENTOR.
EDWIN SINGER
PHILIP ROSENBLATT
EVELYN BEREZIN WILENITZ
BY
Curtis, Morris, & Safford
ATTORNEYS INVENTOR.
EDWIN SINGER
PHILIP ROSENBLATT
EVELYN BEREZIN WILENITZ
BY
Curtis, Morris, & Safford
ATTORNEYS INVENTOR.
EDWIN SINGER
PHILIP ROSENBLATT
EVELYN BEREZIN WILENITZ
BY
Curtis, Morris, & Safford
ATTORNEYS.

United States Patent Office 3,259,886

Patented July 5, 1966

3,259,886

DATA TRANSFER APPARATUS

Edwin Singer, Stamford, Conn., and Philip Rosenblatt, Mount Vernon, and Evelyn Berezin Wilenitz, New York, N.Y., assignors to The Bunker-Ramo Corporation, a corporation of Delaware Filed July 7, 1961, Ser. No. 122,490
4 Claims. (Cl. 340—172.5)

Figure 1:
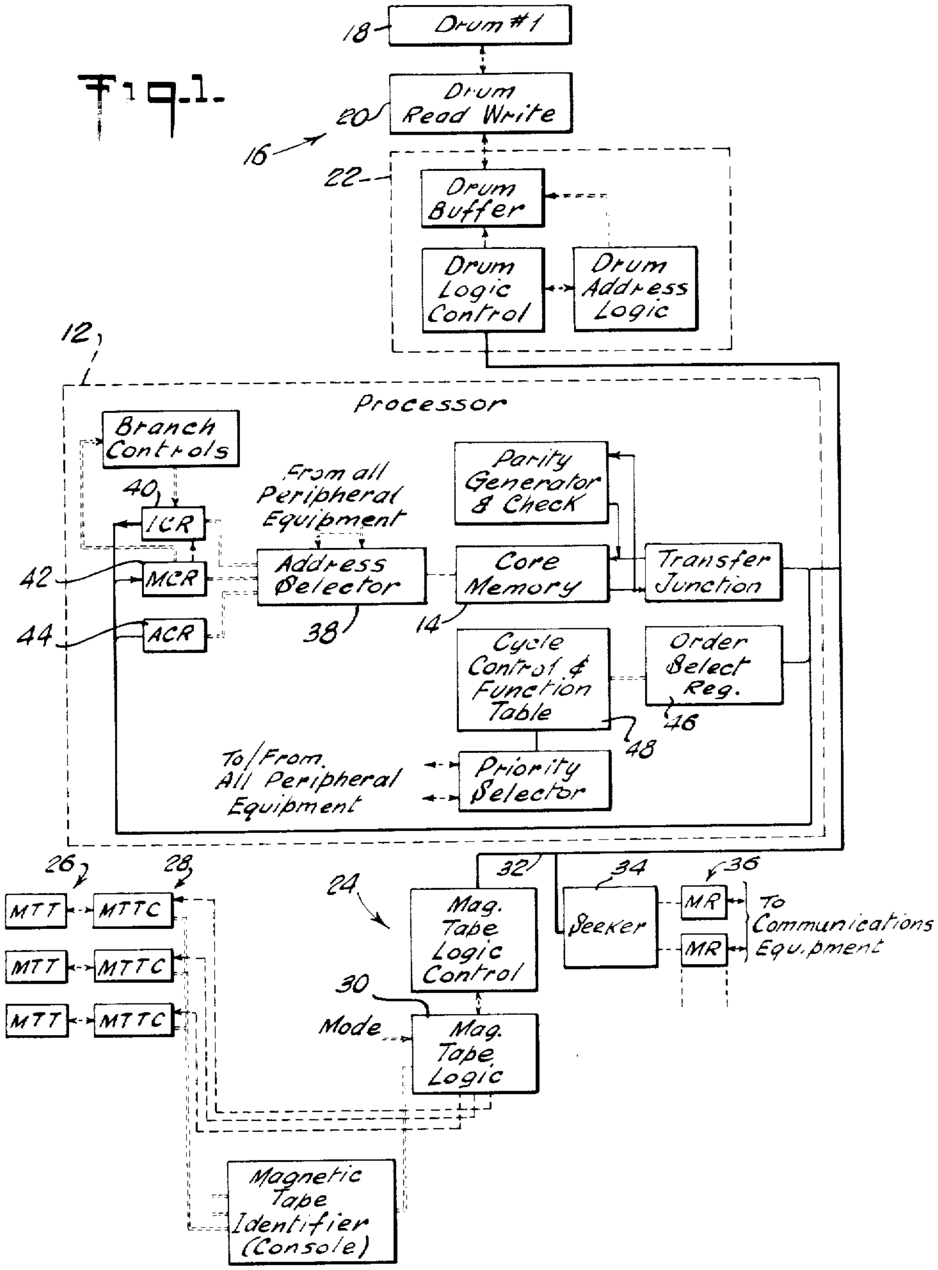

The present invention relates to high speed data processing systems. More in particular, this invention relates to improved apparatus for effecting the internal transfer of data within the computer proper, i.e. between a central data processor and its associated peripheral equipments.

The central data processor consists of all the controls, memory, and arithmetic devices required to perform the necessary manipulations of data, and may, for example, include a high-speed magnetic core array or the like for storing data during the processing thereof. The aggregate of all other devices in the data processing system is termed the peripheral equipment. The peripheral equipment can include, for example, magnetic drums, magnetic tapes, automatic typewriters, teletype units, punched card equipment, paper tape punches, and readers. Also included are especially designed input/output devices called keysets, as well as the logical circuitry operating to effect transfer of information to or from the processor.

This invention is especially directed to so-called "on-line" systems, i.e., systems required to receive information on a random basis from many sources, sometimes over great distances, and to process this information and send back answers, all in very short time periods. On-line data processing systems have been used for many years for industrial and military problems which may broadly be termed inventory control, and which may be regional, nationwide or even worldwide in scope. Examples of such problems are the control and reservation of passenger or cargo space in the transportation industry; the handling of deposits and withdrawals in a savings bank with many branches; the processing, distributing and retrieval of information concerning stock transactions and quotations; and the control of product or supply inventory for large scale manufacturing and distributing organizations.

Computers designed for on-line data processing work have unique requirements not present in the usual commercial data processing situations. Among these requirements are the need for highly reliable continuous performance, multiple inputs, very large storage of information, ability to handle peak loads without wast of computer power, and ability to quickly change programs from one type of transaction to another.

Fast access to large amounts of information, combined with high speed processing of that information, is best achieved by performing the arithmetic (processor) operations in parallel with information transfer to or from the peripheral equipment. In other words, computation is performed in the central processor concurrently with the transfer of data to or from the many different storage devices or input-output devices of the peripheral equipment. Since the central processor normally operates much faster than the terminal equipment, this simultaneous computation and information retrieval assures that full advantage is taken of the processor speed, i.e. the processor need not be required to operate at the slower speed of the peripheral equipment.

In the illustrative embodiment of the present invention to be described herein, the system is so arranged that data required from the peripheral equipment is transferred almost immediately to the central processor, one digit at a time. This is accomplished by an interlacing system of data transfer in which the processor is stopped whenever a digit of the data is available for transfer to the processor. This result is achieved by means of peripheral equipment control registers which, once activated by the central processor, independently control the transfer of data between the peripheral unit and the processor.

The present invention is directed particularly to a "synchronizing register" which temporarily stores the data to be transferred to or from the central processor. The processor is capable of operating at a higher speed than the peripheral equipments, and the synchronizing register disclosed herein includes means to assure smooth data transfer at the different speeds of operation. During a data transfer to the central processor, for example, the synchronizing register produces a signal whenever it has storage space available for another digit from the peripheral equipment, thereby causing the next digit to be transferred from the peripheral equipment to the register; similarly, when this register has a digit to be transfered to the processor, it produces another signal which effects the transfer at the next available cycle of the processor.

Since with this system many peripheral units may be in condition to transfer data to or from the processor core memory at the same time, and because with such a core memory only one address can be selected during any one core cycle, a predetermined set of transfer priorities are provided to control the data transfer. For example, a magnetic tape unit is given higher priority than a magnetic drum, since if a tape character is missed it is necessary to go through the rather lengthy procedure of stopping and rewinding the tape, and then making another pass in the forward direction, whereas if a drum character is missed it can be picked up automatically on the next drum spin.

A priority selector circuit, to be described hereinbelow in detail, receives "BID" signals from the various peripheral equipments indicating that information transfers are to be made, selects a particular peripheral equipment according to a preset priority schedule, and develops an "allow" signal indicating the peripheral equipment selected for transfer of data to or from the processor core memory. If a magnetic tape unit, for example, is assigned top priority, and is in condition to place a digit in the processor core memory at the same instant that a magnetic drum assigned the next priority also is so conditioned, the transfer from the drum will be delayed until the tape digit transfer is complete.

Peripheral equipment control registers are provided to control the transfer of data between peripheral equipments and the processor core memory. Typically, these control registers contain information defining the function to be executed (for example, read or write), the processor core location to or from which data is to be transferred, and the location in the peripheral equipment to or from which data is to be transferred. Thus the peripheral equipment can, for short periods of time, be operated by the control register independently of the central processor. When a control register has been fed a "transfer instruction," that register assumes complete control of the actual data transfer, and the peripheral equipment is, in effect, disconnected from the central processor to carry out the instruction independently of the processor or any other peripheral equipments. In other words, the peripheral equipments take key instructions from the processor and "sequence through" a limited series of steps under their own control.

Once the transfer instruction has been fed to the peripheral equipment control register, the processor is free to carry out other instructions in accordance with its own internal program. The peripheral equipment will be operating simultaneously and, when it requires access to the processor core memory, it indicates this by a signal on its "BID" circuit. The priority selector circuit receives this signal, selects a particular peripheral equipment if more than one is bidding simultaneously, and activates an "interrupt" circuit which stops the processor for a sufficient time for the required data to be transferred to or from the core memory. This priority-interrupt feature thus allows any peripheral equipment, while sequencing through its particular set of instructions, to "stall" the processor for a cycle during which a digit of data can be transferred between the processor core memory and the peripheral equipment.

The various operational steps of the processor are, as is conventional in such apparatus, performed cyclically on a time basis established by a main clock pulse generator. The sequence of events which occurs within all operational cycles, except when the processor is interrupted as above described, is controlled by a circuit adapted to produce so called "function table" signals in accordance with programs stored in the central processor memory. When any peripheral equipment is in condition to transfer a digit to or from the central processor core memory, the "interrupt" signal previously referred to is fed to the function table circuit in the processor to stop its operation, thereby halting the processor. At the completion of the required digit transfer, the interrupt signal goes "low," i.e. is turned off, and the function table outputs are no longer inhibited. Normal operation of the processor then continues under control of the function table signals until another interrupt cycle is initiated.

To summarize briefly, in order to initiate an input/output operation, the processor, following its internal program, will load control information into the proper peripheral equipment control register. The loading of such information automatically signals a start for the transfer operation which is carried out by means of an interlacing technique concurrently with normal operation of the processor. The slower-operating peripheral equipments may be operated simultaneously with computation by the central processor without significant efficiency reduction in either area. The automatic priority system resolves any conflict that might arise during exchange of information between different peripheral equipments and the processor core memory.

Figure 4A:
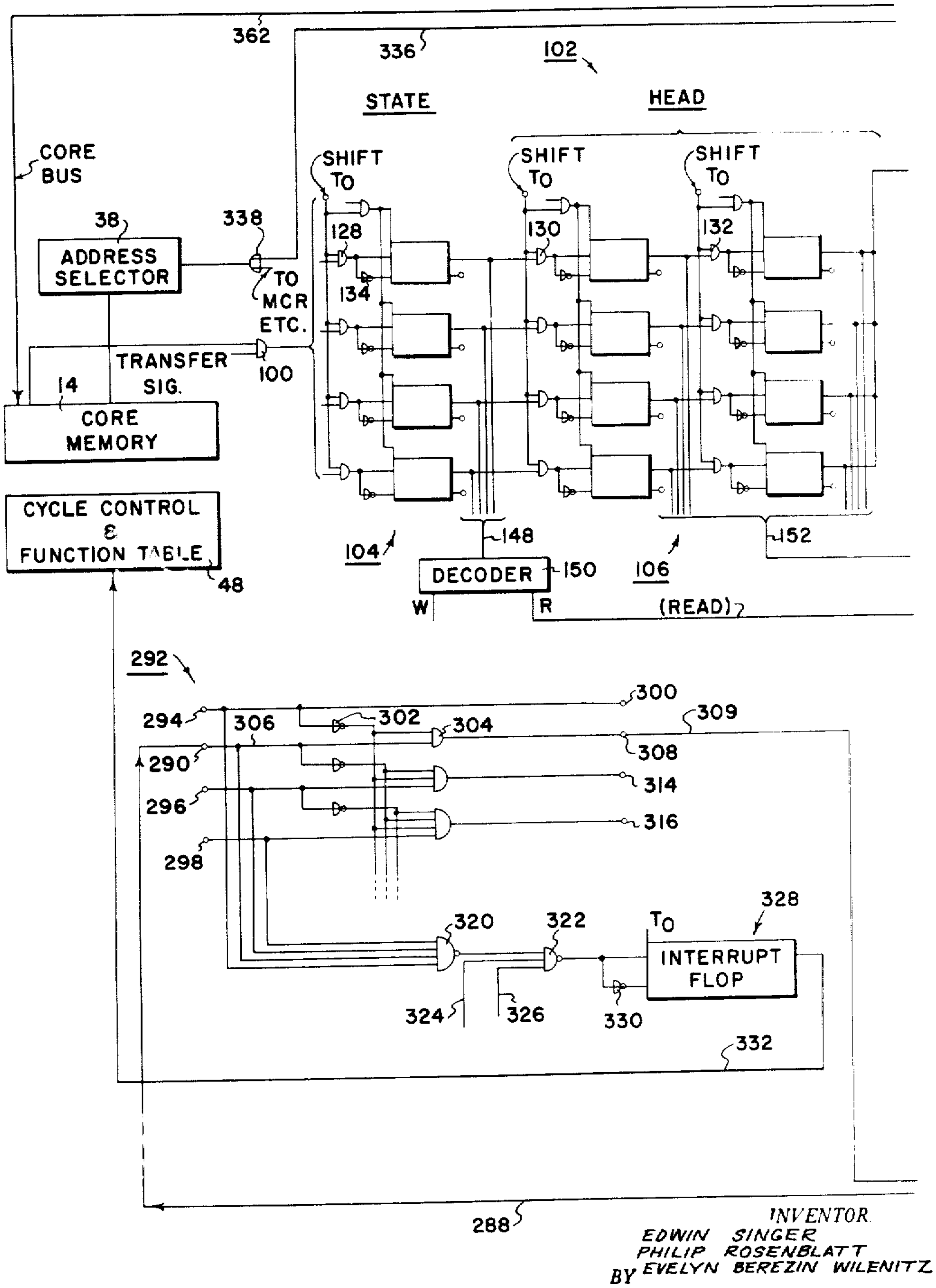
Figure 4B:
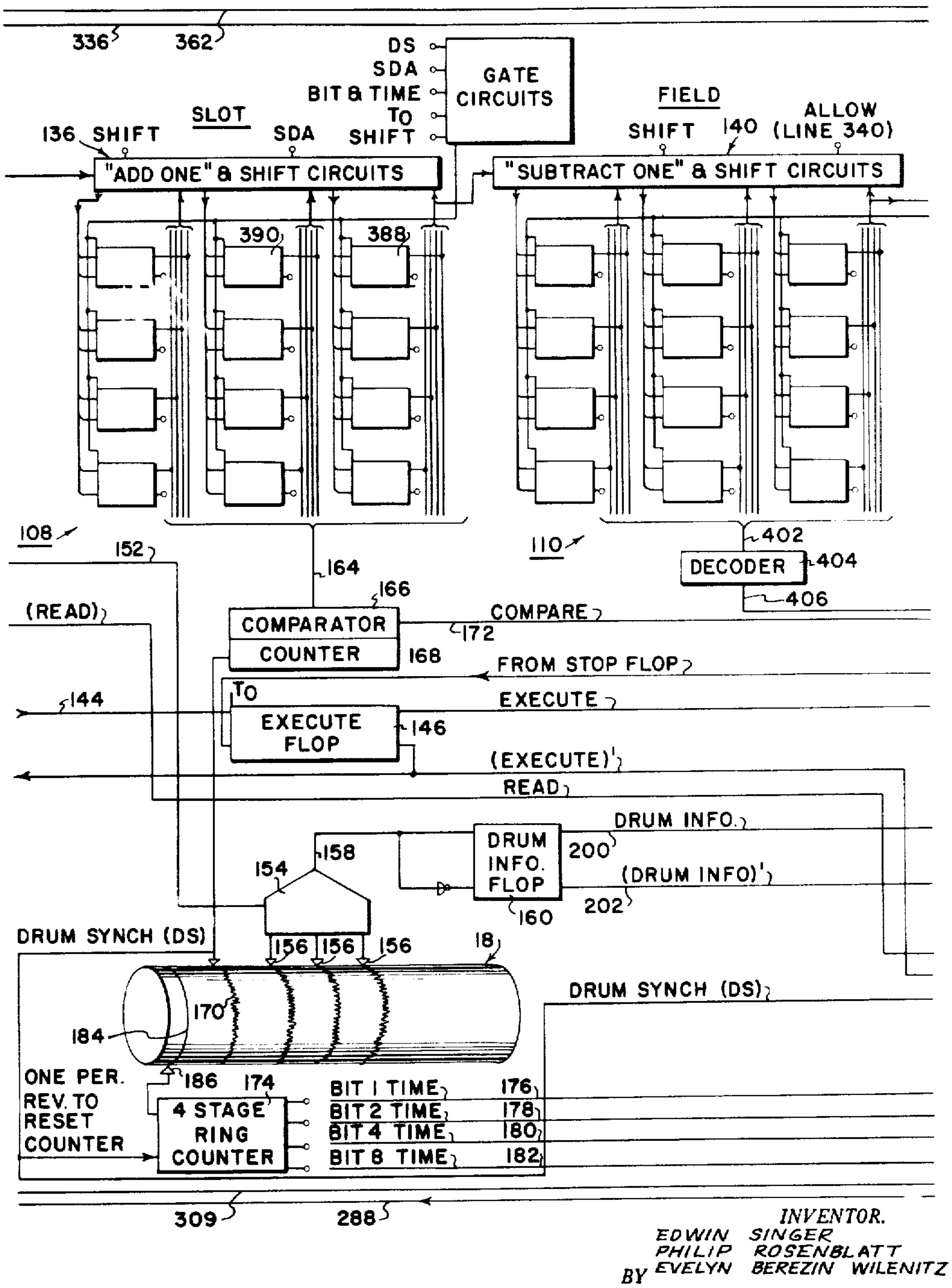
Figure 4C:
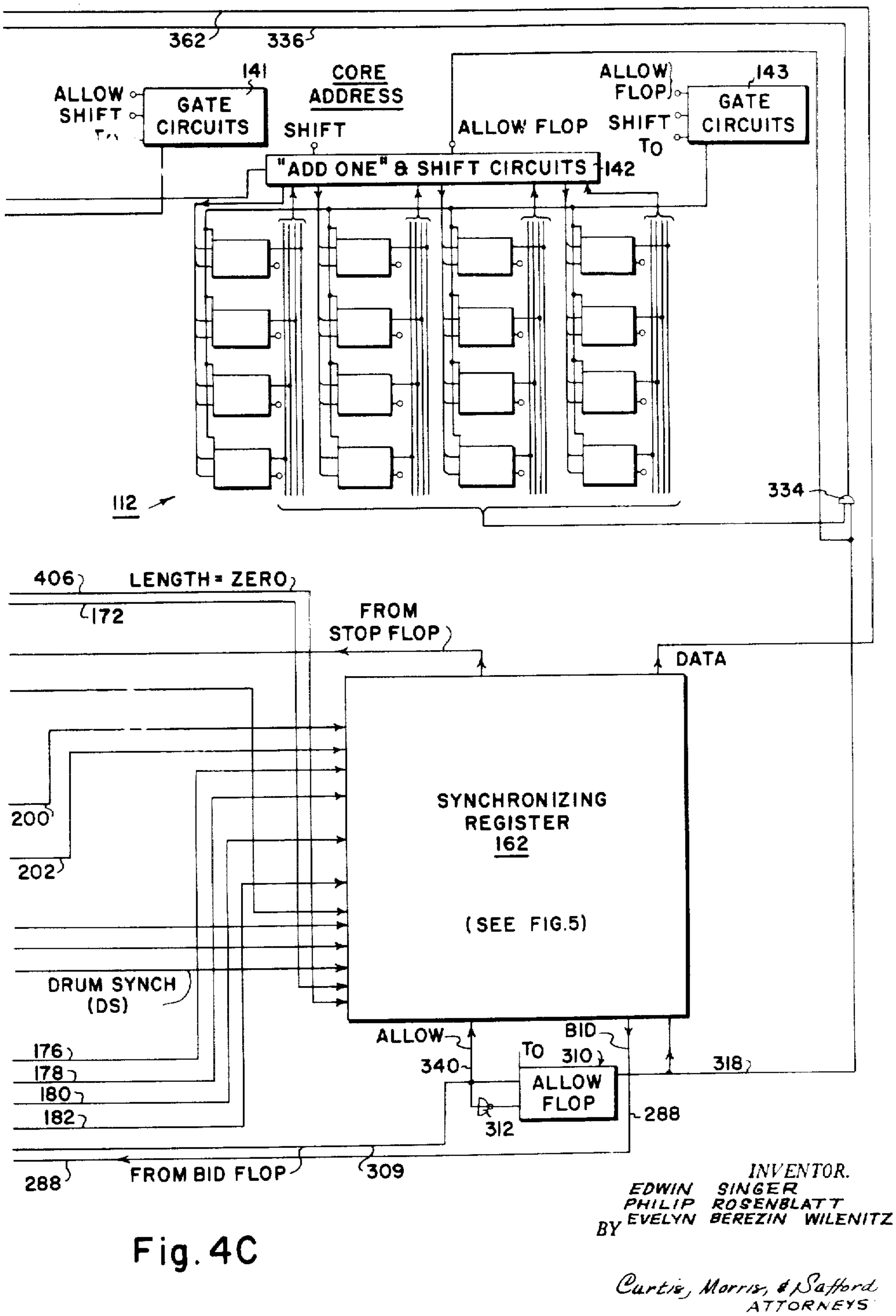
Figure 5A:
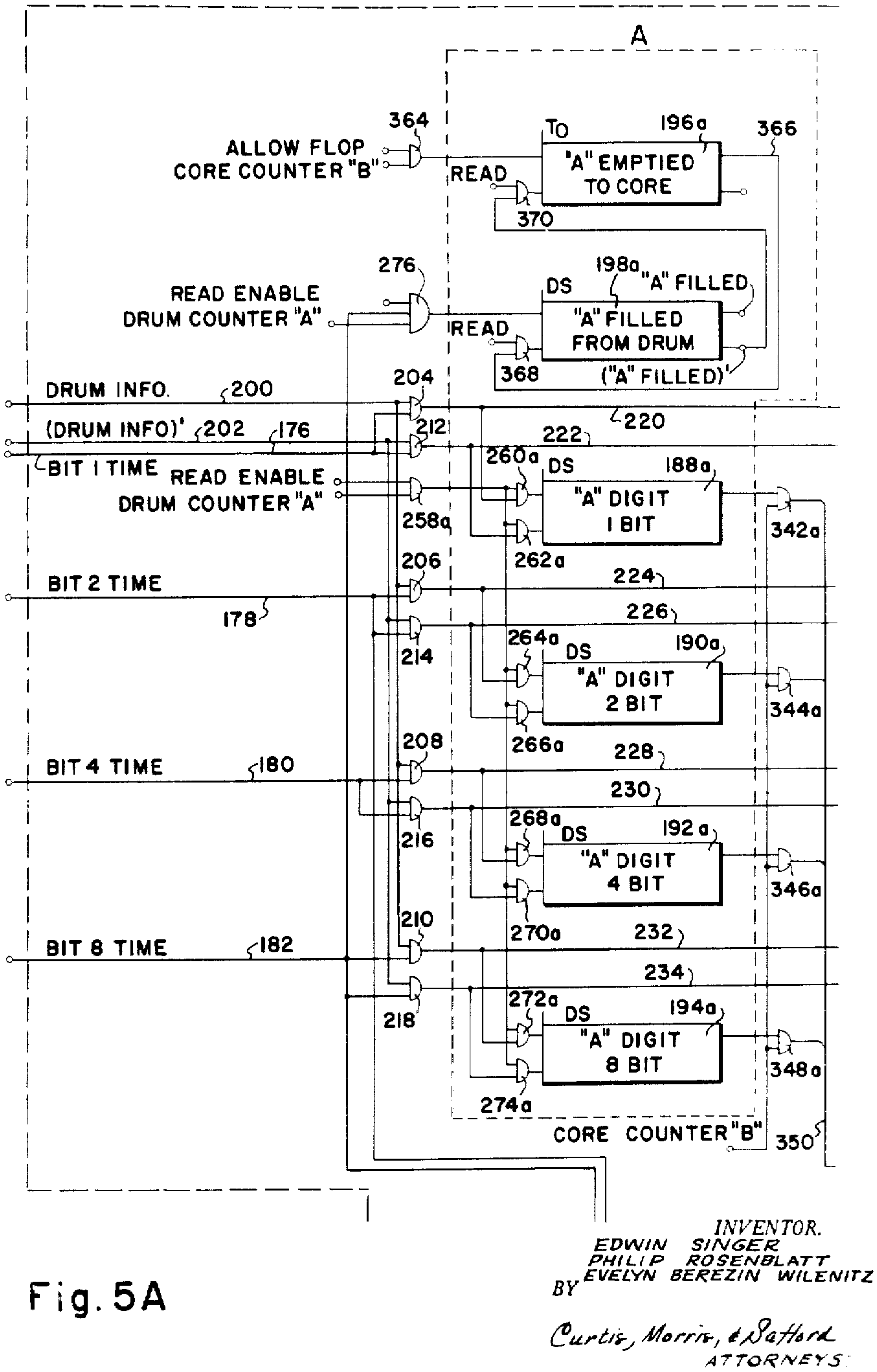
Figure 5B:
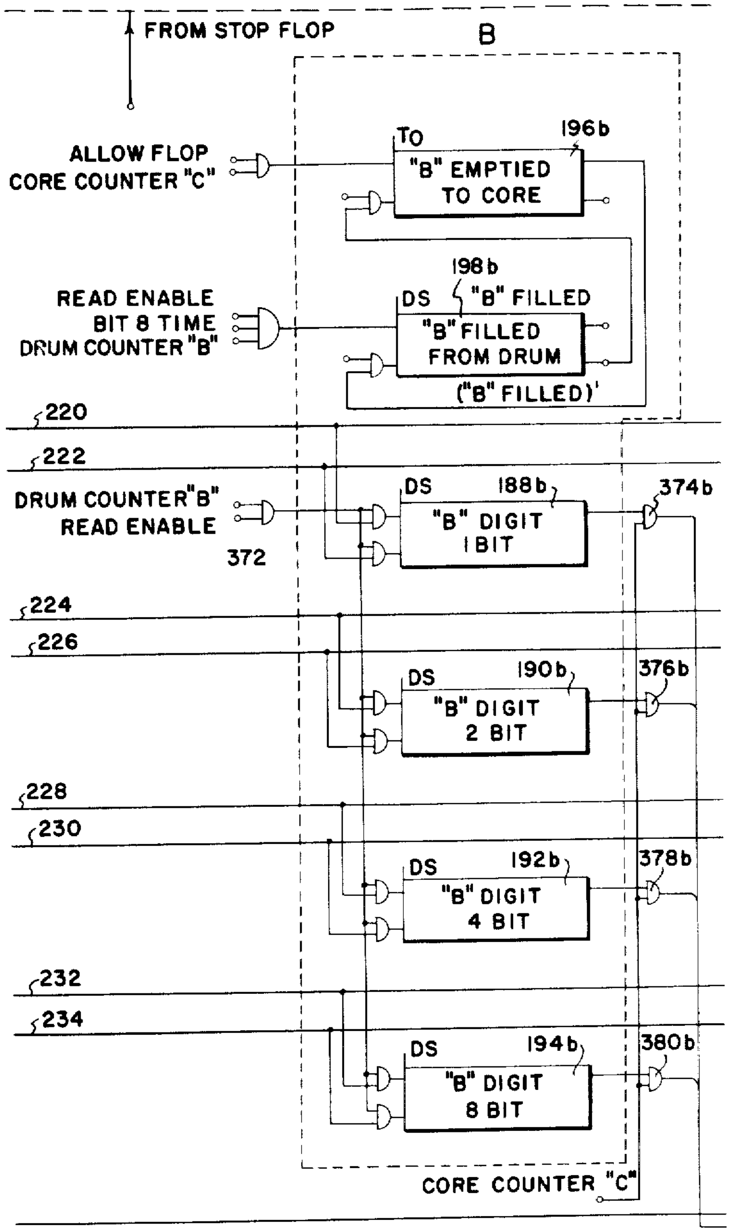
Figure 5C:
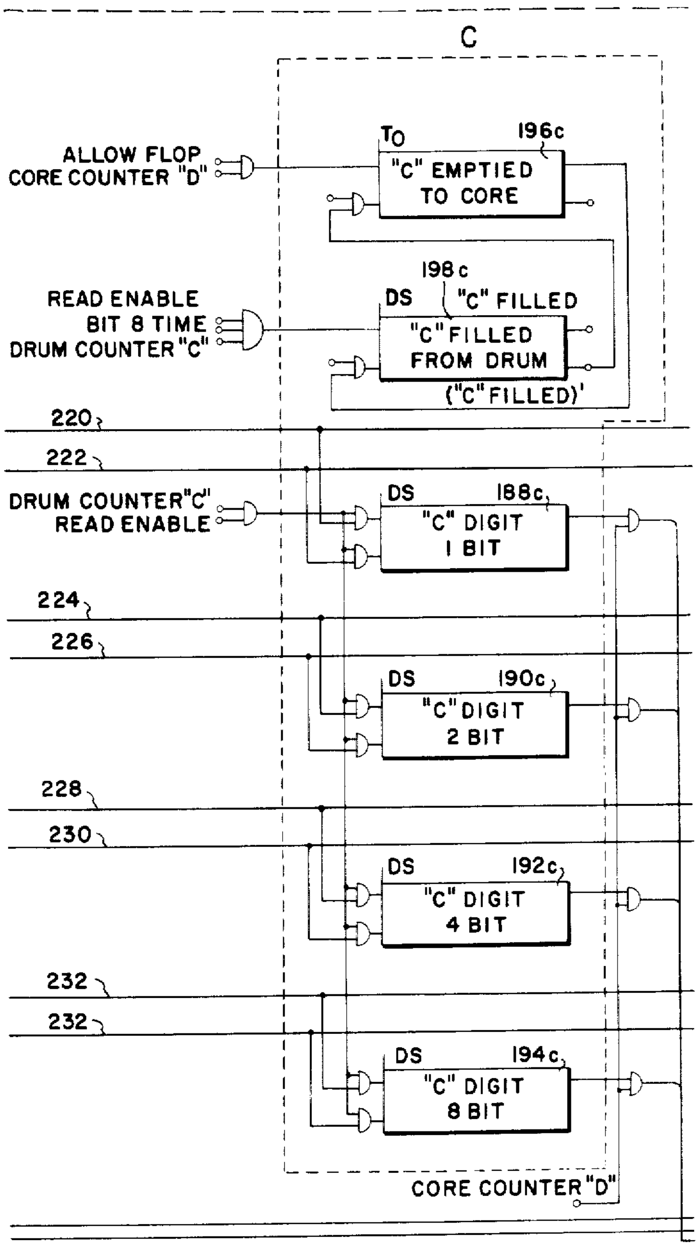
Figure 5D:
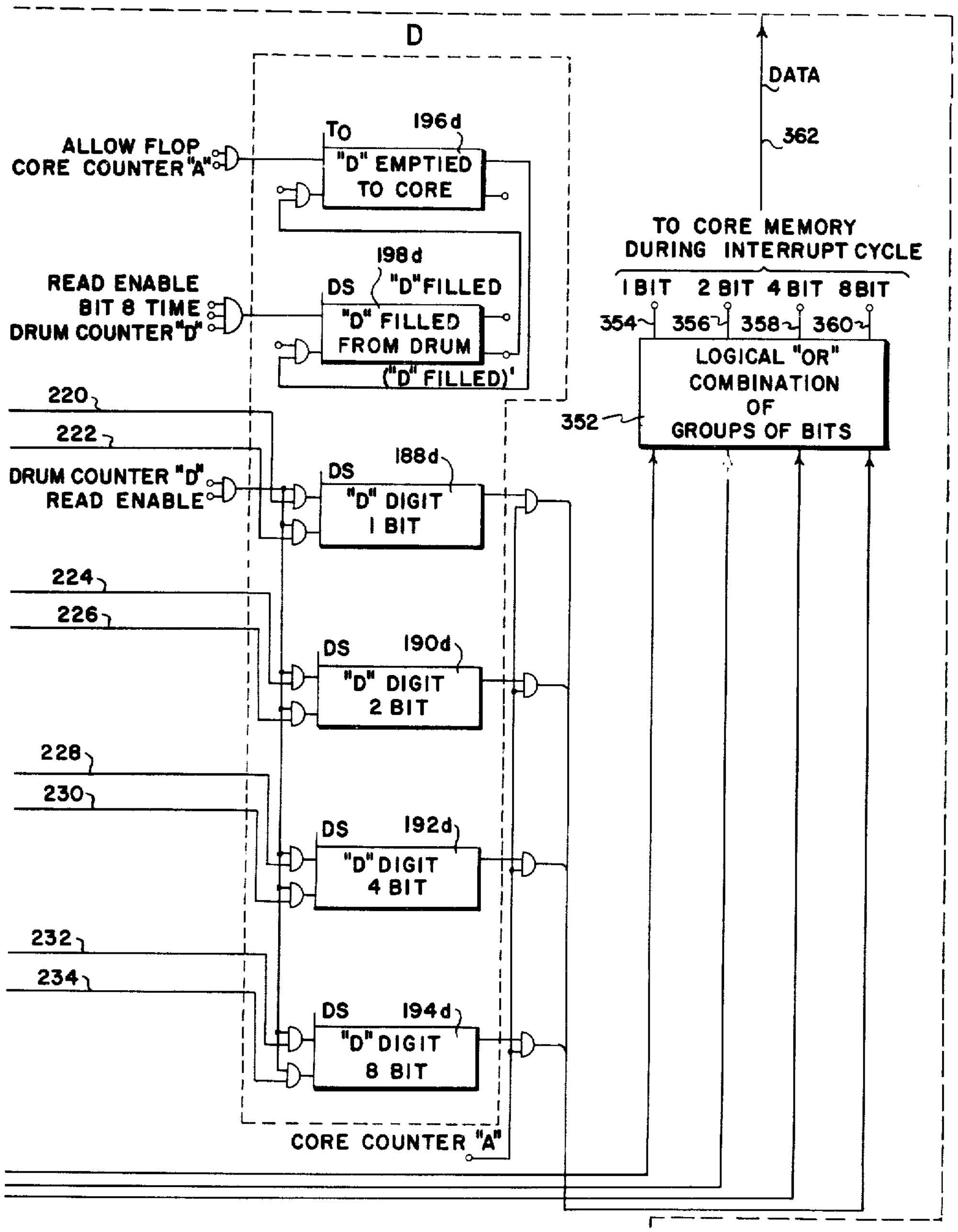
Figure 5E:
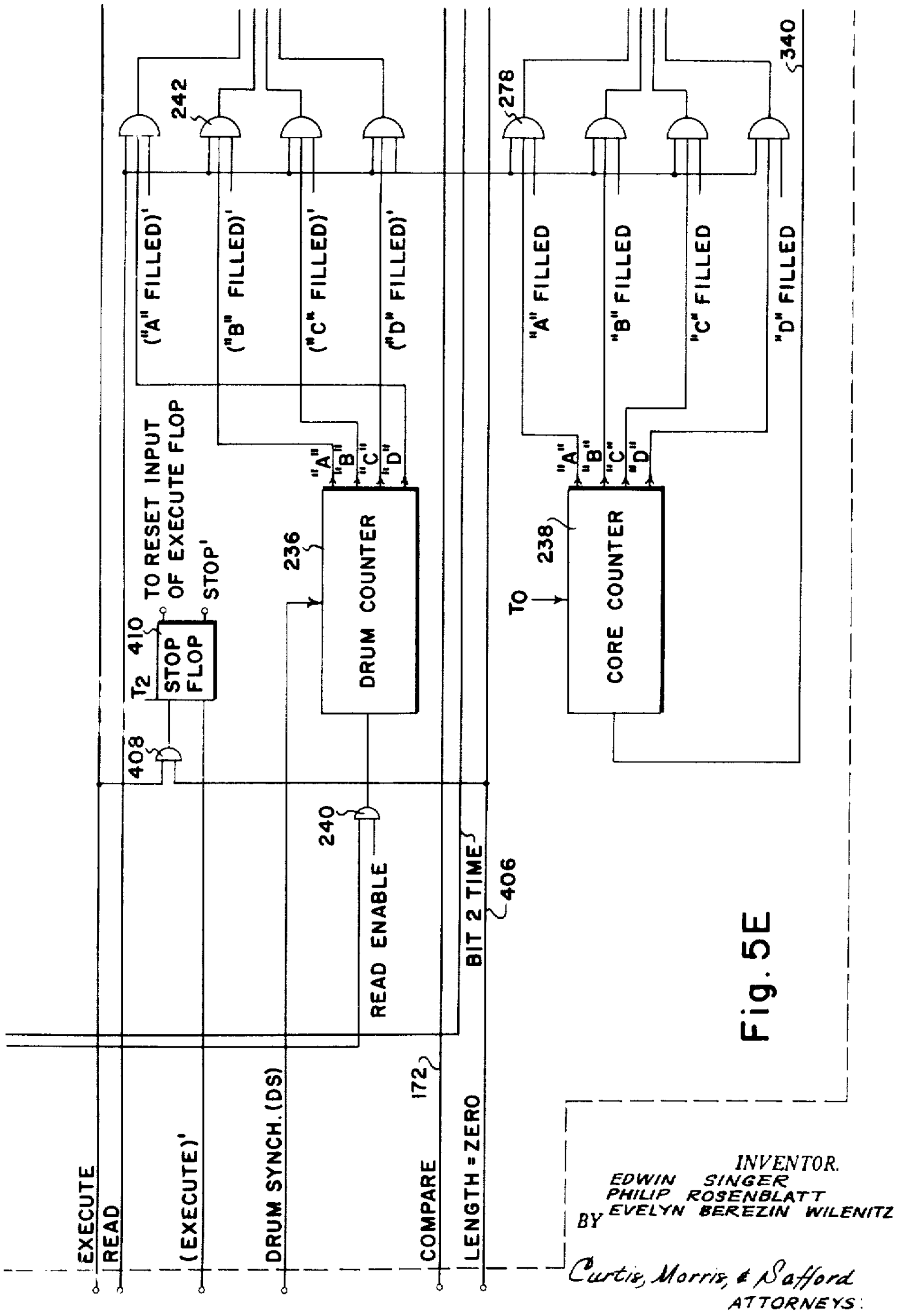
Figure 5F:
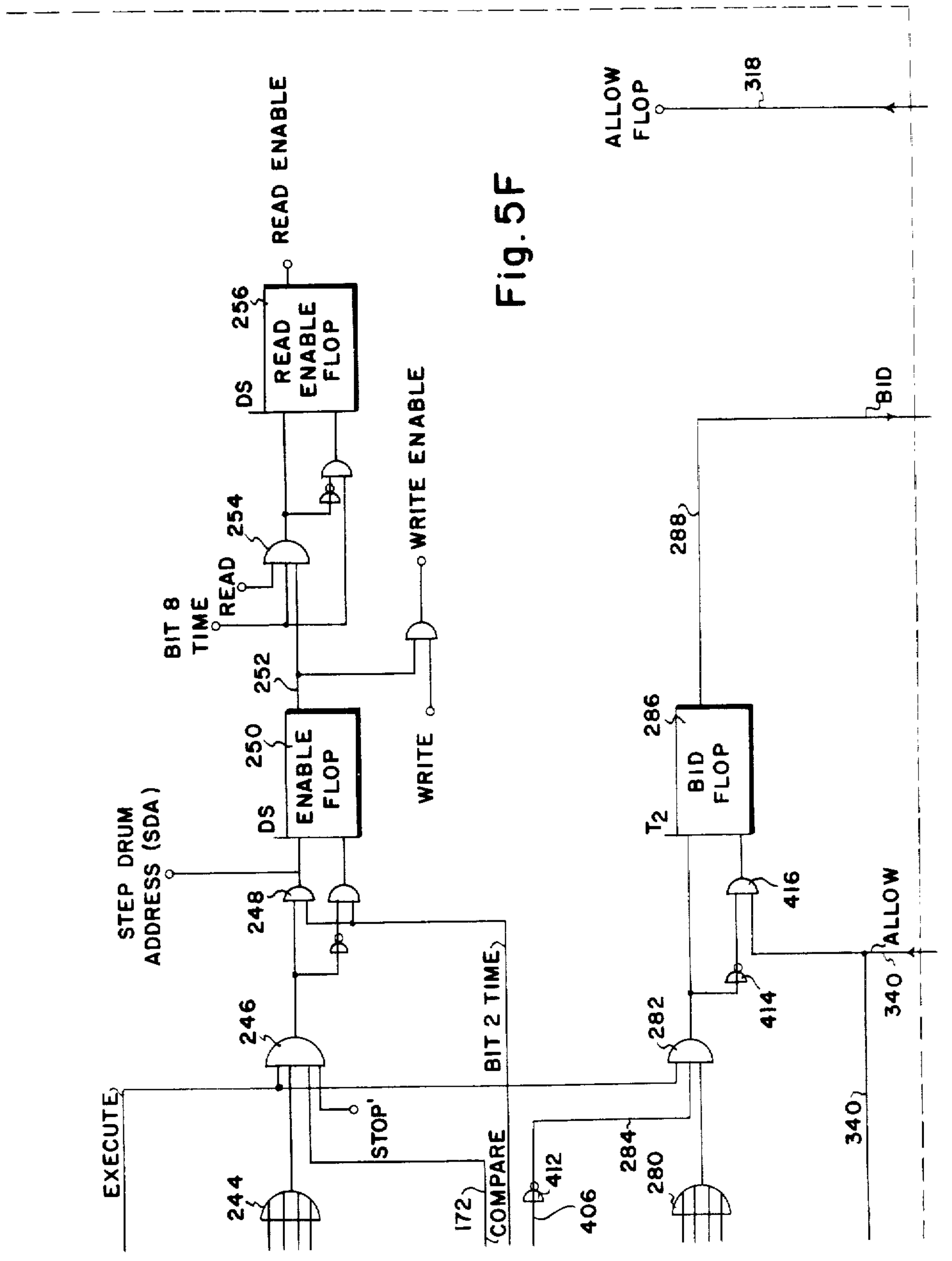
Figure 6:
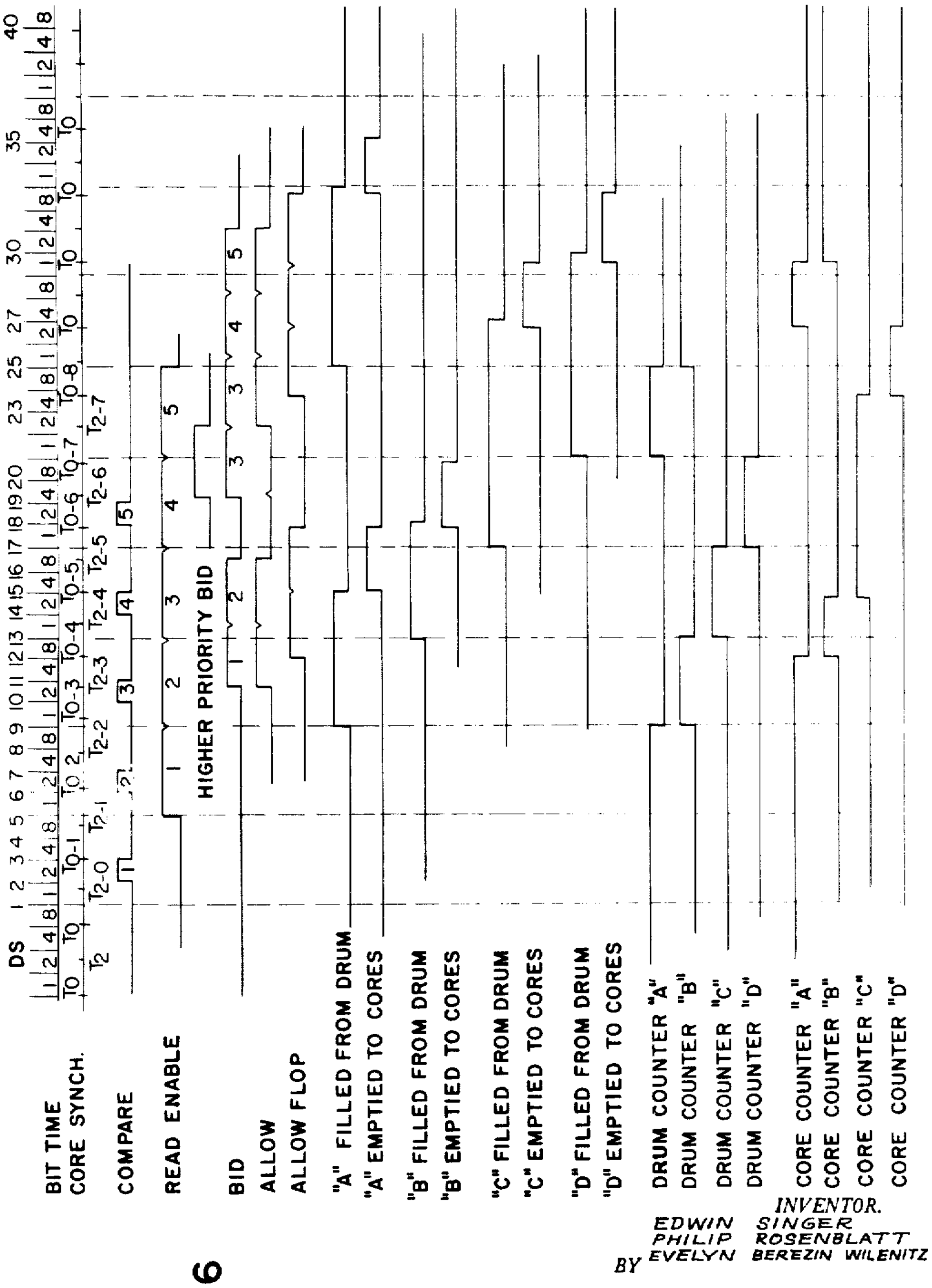
Figure 7A:
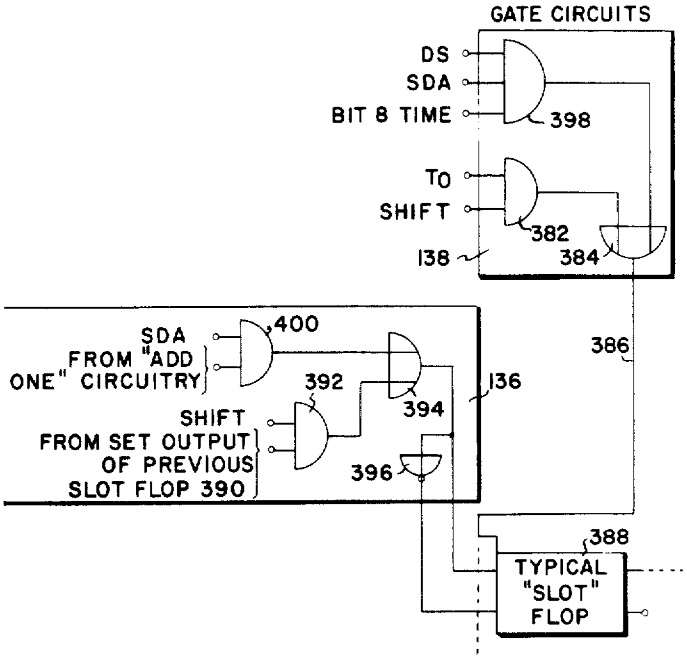
Figure 7B:
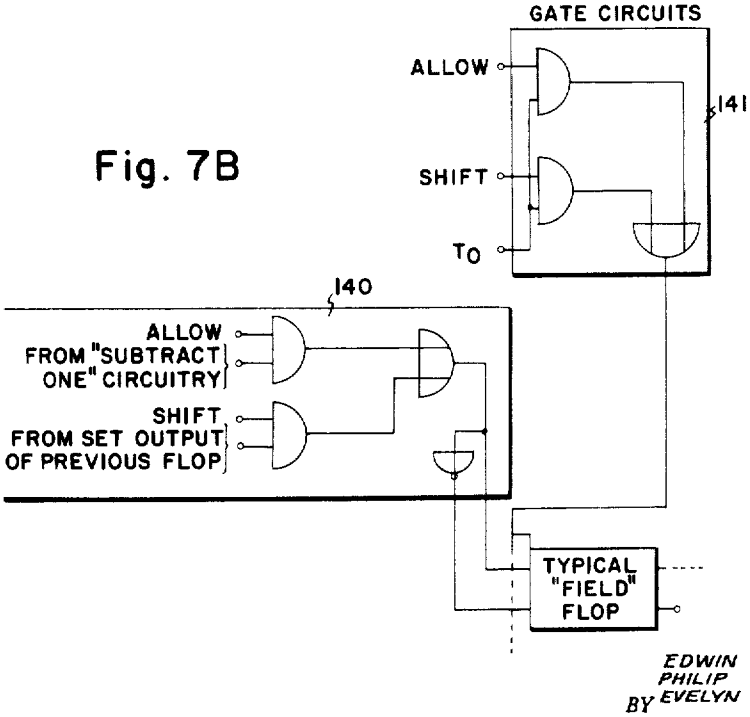
Figure 7C:
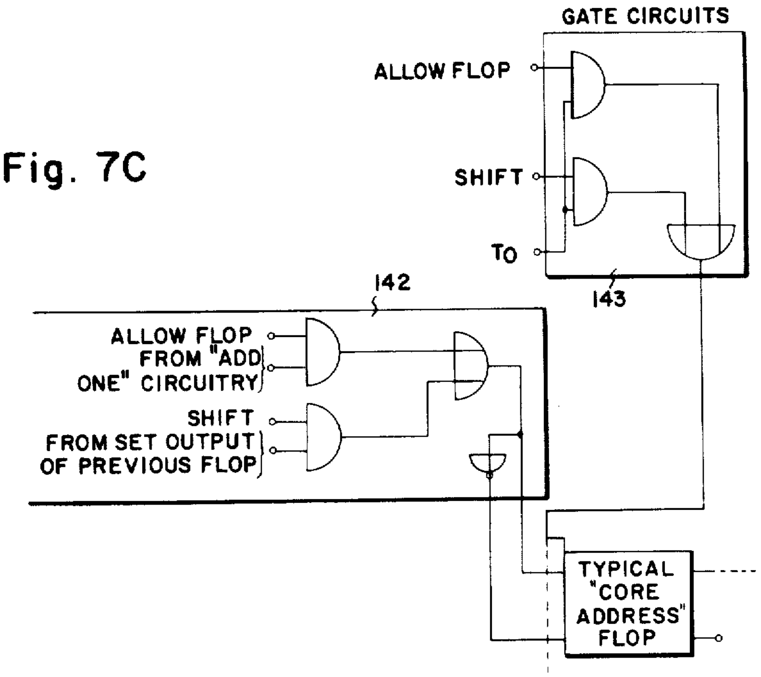
Figure 8:
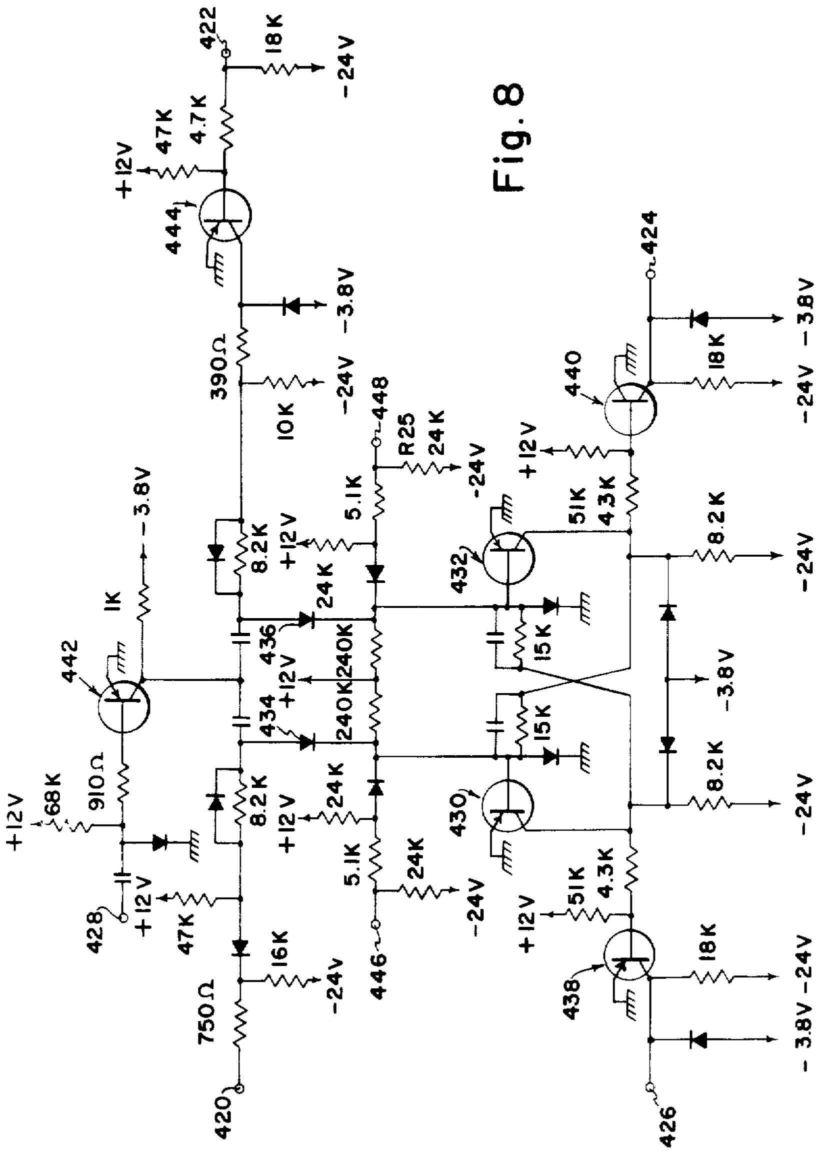

Accordingly, it is an object of this invention to provide improved apparatus for effecting the transfer of data between a central processor and peripheral equipment. A more specific object of this invention is to provide synchronizing register apparatus particularly adapted for transferring data from the peripheral equipment to the central processor, or, alternatively, from the central processor to the peripheral equipment. Still another object of this invention is to provide such apparatus that is adapted to receive the data in serial form and to retransmit the data in parallel form, and vice versa. Other objects, aspects and advantages of the invention will in part be pointed out in, and in part apparent from the following description considered together with the accompanying drawings, in which:

FIGURE 1 is a block diagram showing the overall data processing system;

FIGURE 2 gives a simplified program for the data processor;

FIGURES 3*a*, 3*b* and 3*c* give an expanded outline of the program of FIGURE 2;

FIGURES 4*a*, 4*b* and 4*c* present a schematic diagram showing basic elements of the drum sub-system;

FIGURES 5*a* through 5*f* present a schematic diagram of the synchronizing register which forms part of the drum sub-system;

FIGURE 6 is a timing diagram showing the time relationships of various operations occurring during the retrieval of data from the drum sub-system;

FIGURES 7*a*, 7*b* and 7*c* are schematic diagrams showing details of certain gate circuits used in the drum control register;

FIGURE 8 is a circuit diagram of a preferred form of flip-flop; and

Figure 9A:
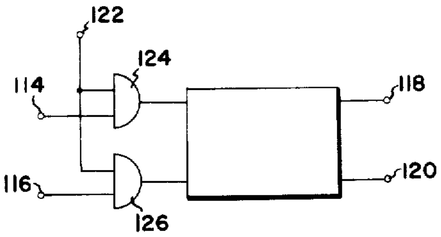
Figure 9B:
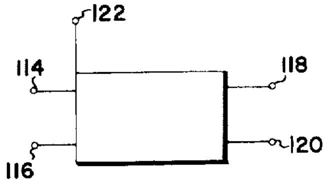
Figure 10:
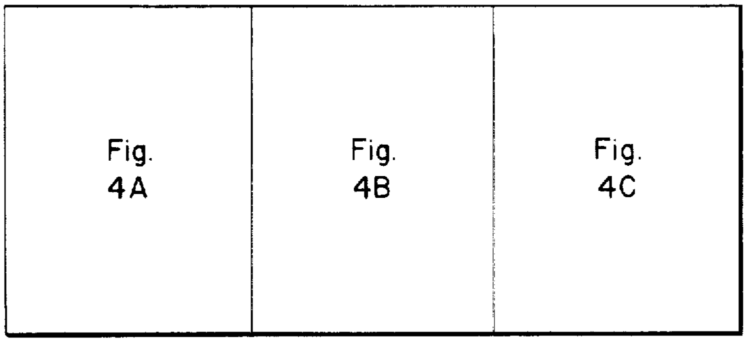
Figure 11:
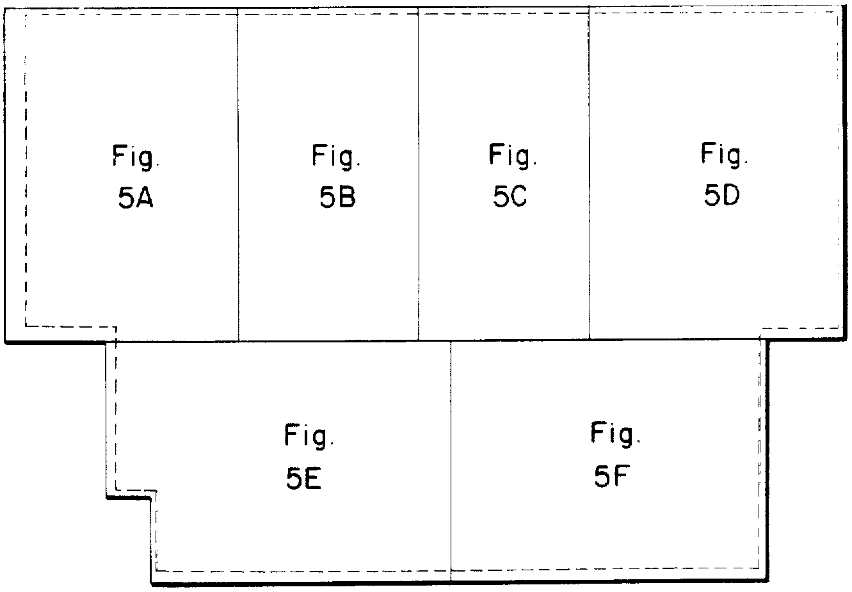

FIGURES 9*a* and 9*b* show equivalent block representations of a typical flip-flop;

FIGURES 10 and 11 show how certain of the individual drawings are fitted together to present the complete schematic diagrams.

The circuit shown in FIGURE 1 is a block diagram representation of a system for storing, handling and retrieving information. In the particular embodiment described herein, the information comprises various data and instructions involved in the reserving of space on any of numerous commercial air flights. It will be understood, of course, that the invention is not limited merely to this particular kind of information. Broadly speaking the invention is useful for any "on-line" type of operation as discussed hereinabove.

As seen in FIGURE 1 the system includes a central data processor, generally indicated at 12. This processor comprises various pieces of equipment, to be described in somewhat greater detail presently. The basic unit of the processor is a magnetic core memory 14 which operates at high speed, and where, during operation of the system, instructions are stored in accordance with which the various associated pieces of equipment operate. The processor may be visualized as the "brain" of the system with the pieces of peripheral equipment which are connected to it, as the "hands," "eyes" and "ears."

Connected to the processor by appropriate wires is a drum memory sub-system, generally indicated at 16. This in turn is divided into parts comprising a magnetic drum memory 18 having the usual associated read/write circuit 20, and a drum logic circuit 22 which controls the input and output of information to and from the drum. Sub-system 16 operates at a decimal digit rate slower than the central processor with its high speed core memory. However, by virtue of circuitry which will be described more fully hereinafter, this limitation of slow speed is minimized and the benefit of the relatively large capacity of a drum memory is more fully obtained.

Similarly connected to the central processor is a second memory sub-system generally indicated at 24. This comprises a magnetic tape transport (MTT) 26 with its associated read/write control circuits (MTTC) 28, and a logic circuit 30. As is known, a tape memory is many times slower than even a drum memory, the virtue of a tape memory being a vast storage capacity at low cost. By way of comparison the average time of access to core memory 14 is of the order of a few microseconds, for drum memory 18, ten or so milliseconds, while for tape memory 26, about half a minute. Now, by virtue of another feature of the system, to be described more fully hereinafter, the two sub-systems, though operating at vastly different speeds, are co-ordinated with the central processor and with each other so that the slow speed of one does not delay the faster and vice versa, and so that each sub-system works at effectively full speed without adverse interference from the other.

The central processor is connected via a line 32 and through a line seeker or line finder circuit 34 to a bank of message registers (MR) 36. These receive and temporarily store information in the form of coded numbers, for example, ten decimal digits, by means of which an answer is obtained from the system as to the status of a given reservation. These message registers are connected by telephone lines, for example, with agent sets at the various branch offices of the airline system. Thus, from each agent set a message query in the form of a code number can be sent to the processor to find out for example, if seats are available on a desired flight. The different code numbers which can be so sent to the processor thus interrogate or instruct it on the making or cancelling of reservations. The operation of the agent sets is well known and accordingly, will not be described further. The reader is referred to U.S. Patent 2,564,410.

When a message register is filled with all the digits of a call number it will signal the seeker which then will, by conventional means, connect it to the processor. A given message register remains so connected to the processor for the brief interval required to digest and translate the call number in the register to the desired answer. This interval in the usual case with the present system is well under one second. When the answering message comprising a coded number has been obtained at the central processor it is sent through the seeker to the message register and thence back to the agent set where the call originated. There it is decoded and an answer to the original query given. Thereafter, the call number or message query in another message register is processed, and so on.

As seen in FIGURE 1, the core memory 14 of the central processor is connected to an address selector 38 which is intimately associated with the core memory and by means of which access to any desired element in the memory is obtained. In the system described herein the core memory has 10,000 memory locations each of which is capable of storing or remembering in binary code a number from 0 to 15 although only 0 to 9 are treated as numerics. This memory and its associated addressing equipment is commercially obtainable and their operation is well known in the art.

Also associated with the core memory are a number of core control registers which control the address selector to transfer information to or from any desired position in the core memory. As seen in FIGURE 1 there is an instruction control register (ICR) 40, a memory control register (MCR) 42, and an accumulator control register (ACR) 44. There is also an order select register (OSR) 46 which, since it acts upon the other registers, indirectly controls the address selector. The functions of these elements, which are well known in the art, are outlined below.

The central processor is of the stored program type and, accordingly, before being set into operation it must be programmed or instructed in the sequence of operations to be carried out in processing a call from an agent set. For a much fuller discussion of programming, the reader is referred to "Programming Business Computers," published by John Wiley & Sons, New York, 1959.

A simplified program for the central processor is given in FIGURE 2. The various instructions of the program are designated by Roman numerals, and each instruction may have a great many individual steps. However, the cycle time of the processor for each step is of the order of twenty microseconds and so many hundreds of steps can be carried out in answering a call in a very short time. The digits in the instruction control register (ICR) during each phase of the program are as shown. These digits correspond to positions in the core memory where instructions (in the form of previously stored numbers) for processing a call are to be found. In the specific illustration given an "availability" call will be processed.

In handling and identifying various "calls," certain steps dictated by machine logic, apart from specific "hardware" are carried out. When a call is received in a message register, the coded call is first transferred to a convenient location in the core memory, and is thereafter "identified" by a series of comparisons with "standard" numbers previously stored in other locations in the memory. In making a comparison, the simplest form of test is used, namely whether or not a specified portion of the call number equals a standard number. Thus several standard numbers may be compared with this call number and discarded before equality with a given standard number is discovered.

The instructions that the processor is to carry out are stored in the core memory. Each instruction is composed of eight decimal digits of which the first two signify the order to be performed, the next two specify the length of field (for the majority of the orders) and the last four provide the core location. Unless the logic of a program dictates otherwise, all instructions are executed sequentially. The Instruction Control Register (ICR) is the control register which determines the sequence in which instructions stored in the core memory will be executed. The address, in the core memory, of the next instruction to be carried out by the processor is stored in the ICR. Instructions are read out of the core memory and executed sequentially under control of the ICR. If the normal sequence is to be interrupted by a "branch" order, and the conditions for branching have been fulfilled, the ICR, which stores the address of the instruction to be performed, is modified, thereby starting the sequence of instructions from a new location in the core memory. The next instruction read out and executed will then be the one specified by the branch order.

The Message Control Register (MCR) provides the major control for data transfer within the processor. It consists of two sections, a six digit working storage section and a six digit retained storage section. The retained storage section remembers the starting point of the memory operand and the original "length-of-field," i.e. the number of locations in which a given set of coded numbers is stored in the memory. The working section of the MCR defines the address of the digit being selected and the length of field during the execution of an order. During the last three cycles of the read out phase of each instruction, the retained and working storage of the MCR are simultaneously loaded with the last six digits of the instruction to be executed. As the digits of the core memory are being addressed by the MCR during the execute phase of an instruction, the working section is modified either by adding one or substracting one from the address digits depending on the type of order, and subtracting one from the length of field digits, thereby indicating the address of the following digit to be transferred and the current length of field. When the length of field digits become zero, and then end of the field has been reached. For branch instructions, the first two digits in the MCR define the test point rather than the length of field.

The Accumulator Control Register (ACR) defines the two end limit addresses of the accumulator. It comprises a six digit retained and a four digit working storage. As each digit is read out of the core memory, the working section is modified so as to indicate the address of the following digit to be read out. The storage section remains fixed through successive operations. The two sections together satisfy the requirements of having a changing register to keep track of the addresses of the digits read out, and of having a fixed register to store the accumulator address through successive operations. At the completion of the read phase of a "Transfer to ACR" instruction, the retained storage section will contain the 6 least significant digits of the instruction. The working storage section is not affected by the Transfer to ACR order. Its contents depend upon the address required by subsequent instructions utilizing the accumulator.

The three sheets comprising FIGURES 3*a*, 3*b* and 3*c* show an expanded form of the program given in FIGURE 2. In FIGURES 3*a*, 3*b* and 3*c* many of the individual steps in each instruction of the program are also given. All instructions for the central processor are carried out in two logical phases. The first, or read-out phase, transfers the instruction number itself from the core memory to the logical circuitry, i.e., the OSR and MCR, where it will command further processing. Each instruction is eight digits in length, and read-out phase for any instruction requires four machine cycles (referred to as CCS1 through CCS4). During the second, or execute phase, actual processing is performed as dictated by the indicated command. The number of machine cycles required to execute each instruction is determined by the function to be performed. A so-called Instruction Flop (IF), i.e. a conventional flip-flop, is used to separate each instruction into a read-out phase and an execute phase. When any order is completed, a signal is generated which "sets" the Instruction Flop. The "set" condition of the Instruction Flop determines the read-out phase of the order. When the instruction has been read out of the core memory and stored in the OSR and MCR, a signal is generated (during CCS–4) which "resets" the IF. The "reset" condition of the IF determines the execute phase of the instruction.

At the beginning of operation of the central processor, the instruction control register (ICR) is set at "0000." Then, starting at core memory locations 0000 and 0001, the number stored in the first eight places of the memory (locations 0000 through 0007) is read sequentially into the order select register (OSR) and into the memory control register (MCR). Assuming, for example, that number "99060000" is stored in the first eight core memory locations, then during cycle control step one (CCS–1) the digits "99" are loaded into the OSR. Next, during cycle control steps 2–4, the ICR is stepped from "0002" to "0008" and the digits "060000" are loaded into the MCR in the sequence shown. During the next portion of instruction I, termed the "execute" portion, the instructions now loaded into the OSR and MCR are acted upon. A signal generated when these registers are loaded causes "reset" of the Instruction Flop (IF) which previously had been "set" during the first portion of phase I while the OSR and MCR were being loaded.

During the execute portion of instruction I (defined by the IF being reset) order "99" previously loaded into the OSR causes a selected one of many possible operations to be carried out. Here, this order is: to test the seeker 34 in FIGURE 1 to determine whether or not it is busy. A busy signal from the seeker indicates that no message register (MR) 36 has yet been filled with a call number from an agent set. If a busy signal is obtained, the system will repeat instruction I until a ready signal from the seeker is given. When this happens instruction II is carried out. During this phase the contents of the MR are loaded into a convenient part of the core memory, in this illustration into positions "2100" to "2109." Assuming that the call number "0367932651" is contained in a MR, the number is transferred as follows.

As seen in FIGURE 3*a*, when the system is instructed, as was explained above, to proceed to instruction II, the ICR, which is set at 0008 from the previous read out, begins the read out of the numbers previously stored in core locations 0008–0015 before the system was put into operation. The first two numbers of instruction II are, for example, "26" and are read into the OSR. Order 26 specifies a transfer of data from the MR to the specified memory field. Thereafter the numbers "102100" are read into the MCR. The first two MCR digits "10" here indicate length of field, while the last four "2100" indicate the first core location of the ten digit region where the ten digits presently in the MR are to be loaded into the core memory.

During the execute portion of instruction II the actual transfer of "call" digits from MR to core memory is carried out, as indicated. The first digit of the call number (here, "0") determines the type of call, i.e. sell, cancel, availability, etc. This digit will be compared with certain "standard" single digit numbers previously stored in convenient core locations to determine what kind of call the call number represents. Since the Processor is of the single address type, it is first necessary to load into the ACR the address (viz, 2100) of the call number from the MR before the comparison with the "standard" number can be performed. Instruction III is therefore a "Set Up Accumulator" order. The order number to do this is "60" and has previously been stored by the person programming the system in core locations "0016" and "0017." The 3rd and 4th digits of instruction III (00) stored in core locations 0018 and 0019 define this length of the accumulator field, in this case a single digit. The address of the accumulator (2100) is stored in core locations 0020–0023.

The set-up of the ACR is carried out during instruction III, which has only a read out portion, at the end of which the ACR is loaded. During this instruction, the MCR is also loaded, but this is trivial for this particular operation.

At the end of instruction III, the ACR has been loaded and the call number stored at the core address identified by the number in the ACR can be compared with "standard" numbers to determine what kind of call (i.e. sell, cancel, etc.) the call number represents. The system does this beginning with instruction IV. The order number for "compare" is "81" and accordingly, this has previously been stored by the programmer in core locations "0024" and "0025." During the read out portion of instruction IV this order number is read into the OSR and the length of field and the address (012300) of a "standard" number is read from locations "0026" to "0031" into the MCR. Upon execute, the single digit at location "2300" is compared with the first digit of the call number at "2100." The final result of this comparison order will be the storage in a register of the result of the comparison. For example, if the "call" digit and "standard" digit are equal, an "Inequality Flop" is "reset" to store this fact. If the digits are unequal, the Inequality Flop is "set."

Branch orders utilize the status of this Inequality Flop whereby the Processor is given decision-making abilities based on what previously occurred during the execution of the stored program. Instruction V is therefore a "branch on Inequality" order wherein the Processor decides on the choice of the next instruction to be read-out, depending on the result of the previous comparison order (IV).

In this example, the output of the Inequality Flop is used as a test point by Branch Order V, and by definition the test point is high if the Flip-flop is "set." Thus, based on the result of this "branch on Inequality" order, the Processor will either call for a new comparison order in which the call number in location 2100 will be compared with another "standard" number stored elsewhere in the core memory, or if branch order V finds equality existed between the digits compared, the Processor in response to that fact continues with the normal sequence of instructions. Here it is assumed that there is equality on the first comparison. The Processor will continue its normal sequence of instructions. The next instruction read-out and executed will be instruction VI in core locations 0040–0047. Now, in instruction V a branch order "98" is read into OSR and "230192" is read into MCR. The first digits "23" of this number do not for this case indicate the length of field in the core memory, but rather a test point. The remaining digits "0192" show the address of the next instruction to be performed if this Branch order had found Test Point 23 high, that is, if the Branch were successful (digits unequal).

Let is be assumed that equality indicates the call number is an inquiry as to whether or not there are seats available on a given flight. Now, the system goes into instruction VI wherein the proper control information, previously stored in the core memory, is sent to the drum control register (DCR) or drum logic which controls the operation of the drum memory-sub system. Assuming this control information is stored in core locations "2350" to "2362," then these address numbers are sequentially loaded into the MCR during the execute portion of instruction VI, and simultaneously the numbers at these core locations are sent to the DCR.

There will be thirteen digits in this number, which to illustrate, is "3024960203400." The last four digits "3400" indicate the location to which the first digit returned from the drum is to be stored in the core memory, while the digits "020" indicate the length of field of the data to be retrieved. The remaining digits tell the drum control logic where to look for the desired information on the drum. Here, the information for the drum logic enables it to operate independently of the central processor, and vice versa. Since the processor operates much more rapidly than the drum memory sub-system, at the end of phase VI the processor can be put to work to handle another incoming call. This would be carried out in accordance with the preceeding explanation. However, to simplify the present discussion, it will be assumed that the processor is made to idle in a closed loop until the information desired from the drum memory is received back.

To accomplish this, in instruction VII, order "99" is read out of location "0048" and "0049," and number "030048" out of locations "0050" to "0055." Then, upon reset, the process is repeated, and so on. During this branching or during any other operation of the central processor, a sub-system has the power to "interrupt," that is to suspend operation of the processor in accordance with its stored program, to permit the transfer of data to or from the sub-system.

When the central processor has completed its analysis of the incoming call from the keyset and has developed the required thirteen digit instructions for the drum sub-system, a "Transfer to DCR Order" signal (DCR being an abbreviation of "drum control register") is applied by the processor to an AND gate 100 shown in FIGURE 4*a*. The digits of the instruction thereupon are fed out from the magnetic core storage unit 14 through this AND gate to the drum control register generally indicated at 102. This control register comprises a conventional flip-flop shift register having thirteen stages, one for each decimal digit of the instruction fed thereto from the core storage unit. For specific information on the detailed design of shift registers, reference may be made to numerous publications, such as "Pulse and Digital Circuits" by Millman and Taub, published in 1956 by the McGraw Hill Book Company, Inc.

The control register 102 comprises five sub-registers consisting of a state register 104, a head register 106, a slot register 108, a field register 110 and a core address register 112. Each of these sub-registers consists of one or more individual register stages, the number of stages being determined by the largest digital number required to be stored in the particular sub-register.

Each stage of the control register is composed of four flip-flop units to accommodate the storage of decimal digits. Various types of flip-flops may, of course, be used for this purpose. A preferred transistorized flip-flop is shown schematically in FIGURE 8, and the operation thereof is briefly described at the end of this specification. However, to clarify the present discussion, it is noted that this flip-flop is of the type (referring now to the block diagram of FIGURE 9*a*) having set and reset inputs 114, 116, set and reset outputs 118, 120, and a clock input 122 which is combined with the set and reset inputs by corresponding AND gates 124, 126. Whenever the set input 114 goes "high" (i.e. logical one), the flip-flop will be conditioned to its "set" state upon the occurrence of the next clock pulse, and the set output 118 will be high while the reset output 120 will be "low" (logical zero). On the other hand, if the reset input 116 goes high (and the set input goes low), the flip-flop will be placed in its "reset" state at the next clock pulse, and the set output 118 will go low while the reset output goes high.

To simplify the drawings herein, the flip-flops will be shown with the AND gates 124, 126 omitted, as indicated in FIGURE 9*b*, and the clock input will be shown at the upper left-hand corner of the block. It is to be understood, however, that the FIGURE 9*b* showing is the functional equivalent of that shown in FIGURE 9*a*.

Returning now to FIGURE 4*a*, when the processor opens AND gate 100 to transfer the instruction to control register 102, the processor simultaneously produces a conventional Shift signal (high) which is applied to correspondingly labelled terminals of this register 102 and serves to open gates 128, 130, 132, etc., through which the digits are transferred from stage to stage. This Shift signal goes high for each control digit to be shifted until all thirteen digits have been transferred from the processor to the control register.

The instruction digits first enter the state register 104, and thereafter are shifted along through the other stages of the control register. The set inputs of the register flops are connected to the reset inputs through respective inverters 134, etc., so that when the set input of any flop is high, its reset input will be low and vice versa.

The register flops also are supplied with clock pulses from the central processor clock pulse generator (not shown). This generator produces two distinct trains of clock pulses, referred to as $T_0$ and $T_2$ clock pulses respectively. The pulses of both trains have identical periods (e.g. 10 microseconds), but each $T_2$ pulse occurs midway between a pair of $T_0$ pulses. As indicated on FIGURES 4*a*, 4*b* and 4*c*, the control register flops are controlled by the $T_0$ train of processor clock pulses, gated by the Shift signal so that the control digits will not be shifted from stage to stage after all thirteen digits have been loaded in the control register.

The set outputs of the flops for the state register 104 are fed through respective shift gates 130 to the set inputs of the first stage flops for the head register 106, which are arranged like the state register flops and similarly are controlled by $T_0$ clock pulses. The second stage flops of the head register are identical to the first stage flops.

The three stages of the slot register 108 are identical to those of the state and head registers, in that (1) they include identical shift circuits, i.e. the flops of the several stages are interconnected through shift gates, (2) the flop reset inputs receive inverted signals from the set inputs, and (3) the flops are controllable by $T_0$ clock pulses. However, for reasons that will be apparent hereinafter, it also is necessary to provide additional control circuits for the slot register flops, to permit the state of these flops to be changed during the subsequent transfer of data between the drum and the processor core storage. Accordingly, to simplify the drawings, these augmented flop control circuits are indicated by a block 136 (labelled "Add One & Shift Circuits"). Circuits for adding or subtracting digits are well known in the art, e.g. see "Pulse and Digital Circuits" by Millman and Taub, McGraw Hill Book Co. (1956), page 335, section 11–6. Specific circuitry for accomplishing this result forms no part of the present invention.

In addition, there is provided a clock control circuit 138 (labelled "Gate Circuits") which determines whether the slot register flops are clocked by $T_0$ pulses or by other timing signals to be described. For the moment, however, it will be sufficient to note that the slot register flops are clocked by $T_0$ pulses during the time that the instruction digits are being transferred from the processor to the drum control register.

The field register 110 and the core address register 112 are also fundamentally identical to the state register 104 and the head register 106, in that they include shift gates between the various stages, and the reset inputs of the flops receive inverted signals from the set input lines. Moreover, like the slot register 108, the field and core address registers include additional control circuitry (as indicated by blocks 140 and 142) for changing the condition of the flops during the subsequent transfer of data between the drum and the processor. These registers also include gate circuits 141 and 143 which gate the $T_0$ clock pulses in accordance with whether the control digits are to be shifted (during loading) or whether the stored number is to be altered (during data transfer).

After the central processor has completed the transfer of the thirteen decimal digits to the control register 102, conventional logic circuitry in the processor causes the Shift signal to go low, thereby isolating the various stages of the control register so that no further shifts take place. Simultaneously, a "start" signal is developed by this logic circuitry to cause a line 144 to go high. This line is connected to the set input terminal of an Execute flop 146 so that the set output of this flop goes high. When this occurs, the drum sub-system operation is initiated under the independent control of the drum control register 102.

The data stored in the state register 104 is applied to leads 148 connected to a decoder 150 of conventional construction, and which operates to cause either a "read" line (R) or a "write" line (W) to go high, depending upon the number of the digit which was transferred to the state register. In the present case, it will be assumed that the read line R goes high, indicating that data is to be retrieved from the drum sub-system.

The two stages of the head register 106 are connected by leads 152 to a head selector circuit indicated in block outline at 154. This selector circuit comprises a distribution network of conventional construction, such as that of the pyramid or tree configuration, and which is capable of effecting a one-out-of-a-hundred selection. Each of the hundred record-reproduce heads 156 (only three of which are shown) is connected to a corresponding one of the hundred selection terminals of this selector circuit. Consequently, one of these heads will be connected to the output line 158 of the selection circuit, in accordance with the digital data stored in the head register 106, and the data read by that head will be fed to a Drum Info Flop 160, the set and reset outputs of which are directed to a synchronizing register indicated in block outline at 162 (shown in detail in FIGURES *5a* through *5f*).

The slot register 108 is provided in order to determine the point (or points) on the selected drum track from which data is to be read. For this purpose, the slot address (i.e. a number, such as 327) contained in the slot register is fed through leads 164 to a comparator 166 which also receives the output of a binary counter 168 operated by synch pulses (DS) from a synch track 170 on the drum 18. This synch track carries conventional synch pulses for locating any selected one of the 1000 horizontal "slots" in which the inventory data are disposed circumferentially around the drum. In this case, each slot contains 4 bits of data (representing a decimal digit), these bits being arranged serially; the synch track also contains 4 synch pulses for each slot, i.e. one for each bit. When the number developed by the counter 168 is identical with the number contained in the slot register 108, the comparator output line 172 ("compare") goes high.

The drum synch pulses (DS) from drum track 170 also are directed to a 4-stage ring counter 174, of conventional construction, which sequentially energizes its output lines 176, 178, 180 and 182 synchronously with the occurrences of the synch pulses. These output signals are referred to as Bit 1 Time, Bit 2 Time, Bit 4 Time and Bit 8 Time, to indicate the relationship thereof with the corresponding synch pulses. The drum is provided with an additional synch track 184 having one pulse per revolution which is sensed by a reproducing head 186 and fed to counter 174 to reset its circuitry at the end of each drum spin and thereby maintain synchronism between the drum and the counter. The counter output lines 176–182 are connected to the synchronizing register 162 to control its operation as now will be described.

Referring to FIGURES *5a* through *5d*, the drum synchronizing register 162 comprises four identical stages A, B, C and D, each capable of storing one decimal digit. For this purpose, each stage includes four storage flops 188*a*–194*a*, and 188*b*–194*b*, etc., with each flop serving to store one bit of a four-bit decimal digit. The register stages also include a pair of control flops 196*a*, 198*a*, 196*b*, 198*b*, etc., which indicate by their condition (set or reset) whether the corresponding stage has been emptied to the cores 14 of the processor (see FIGURE *4a*), or whether it has been filled from the drum 18.

The Drum Info flop 160 is so arranged that its set output 200, referred to as Drum Info, goes high whenever a positive data pulse is read from the drum, while its reset output 202, referred to as (Drum Info)′, goes high whenever a negative data pulse is read from the drum. As in all such flops, when its set output is high, its reset output is low, and vice versa.

(Note: In the circuit diagram of FIGURES *5a* through *5f*, to avoid undue complexity a number of the circuit interconnecting leads have been replaced by common terminal identifying phrases. Therefore, in the following description, all terminals having the same identification should be considered to be connected together.)

The "Drum Info" signals on lead 200 are directed to four AND gates 204–210 which are controlled respectively by the four sequential outputs 176–182 of the ring counter 174 (FIGURE *4b*) identified as Bit 1 Time, Bit 2 Time, etc. Similarly, the (Drum Info)′ signals on lead 202 are directed to four AND gates 212–218 which also are energized respectively by the four outputs of counter 174. The outputs of AND gates 204 and 212 are connected to corresponding leads 220 and 222 which pass through all stages A, B, C and D of the synchronizing register 162 to transmit drum data to the first storage flops 188*a*, 188*b*, etc. of these stages as will be explained. Similarly, leads 224 and 226 are provided for AND gates 206 and 214; leads 228 and 230 for AND gates 208 and 216; and leads 232 and 234 for AND gates 210 and 218.

With this arrangement, each stage A, B, C and D of the synchronizing register 162 is connectible directly to the output of the drum 18, in accordance with gating signals applied synchronously with the movement of the drum, so that no shifting of data digits between the various stages is required. The four bit-storage flops of each stage are filled in sequential order with the data bits being read serially from the drum. The four stages also are filled sequentially (i.e. in order A, B, C, D, A, B, etc.), and are emptied to the processor core storage in the same order.

To establish the timing relationships for filling and emptying the synchronizing register 162, there are provided a drum counter 236 and a core counter 238. The drum counter is a 4-stage ring counter, of usual construction, activated by the drum synch pulses (DS) in conjunction with control signals fed through an AND gate 240, and is arranged to produce sequential signals on four output lines A, B, C, D. The core counter similarly is a 4-stage ring counter, activated by the central processor clock pulse $T_0$ to produce sequential signals on its four output lines A, B, C, D.

Referring now to the timing diagram of FIGURE 6, the drum synch pulses (DS) are shown at the top as the basic timing reference, the periods between these pulses being identified as "Bit Time" and shown immediately beneath as 1, 2, 4, 8, 1, 2, etc. Next below the Bit Time scale is shown the central processor clock pulses. As mentioned hereinabove, there are two different clock pulses, designated $T_0$ and $T_2$, the $T_2$ pulses occurring midway between consecutive $T_0$ pulses. To differentiate between individual clock pulses, they are assigned an additional subscript number, i.e. $T_{0-1}$, $T_{0-2}$, $T_{2-1}$, $T_{2-2}$, etc. It will be noted that the clock pulses $T_0$ (or $T_2$) occur more often than once every four drum synch pulses (equivalent to one decimal digit), because the central processor operating speed is somewhat higher than that of the drum.

Assuming now that the equipment is to start the readout of data from drum 18, the initial conditions will be as follows: all stages A, B, C, D of the synchronizing register 162 are empty (i.e. all bit storage flops are reset), all control flops 196*a*, 198*a*, 196*b*, 198*b*, etc., are reset, the drum counter 236 and core counter 238 are both set to stage A (so that Drum Counter A signal is high and Core Counter A signal is high, while all the other counter signals are low as shown in the timing diagram at the initial time of DS–1.) The "read" line (output of decoder 150, FIGURE 4*a*) and the Execute signal (from Execute flop 146) also are high, but these lines remain high during the entire read-out operation and hence are not shown on the timing diagram.

As the drum 18 rotates, the output of the counter 168 increases until it equals the numerical number (address) of the first "slot" containing a digit of the desired data. At this time, the output of the comparator (the "compare" line 172) goes high. For timing reasons, the apparatus is so arranged that the compare line goes high during bit 2 Time.

Prior to this time, the high ouput on the Drum Counter A lead has been fed to an AND gate 242 together with two other high inputs, i.e. "read" and (B-filled)′. Thus, gate 242 is opened, and passes its high output through an OR gate 244 to another AND gate 246. This latter gate has three other inputs, two of which (Execute and Stop′) are high at the start of drum read-out; the remaining input is the "compare" line referred to previously.

Consequently, when the "compare" line goes high (immediately after DS–2 synch pulse), gate 246 opens and transmits a high signal to an AND gate 248 having as an additional input the Bit 2 Time signal. Since this latter signal also goes high immediately after the DS–2 synch pulse, AND gate 248 opens to prime an Enable Flop 250. This flop is clocked by DS synch pulses so that, on the next DS pulse (DS–3), flop 250 is shifted from reset to set condition and its output line 252 goes high.

Enable Flop output 252 is connected to another AND gate 254 having as additional inputs the "read" line (now high) and the Bit 8 Time signal. Thus, this gate opens after DS–4 pulse (i.e. during bit 8 time) and primes a Read Enable flop 256 which is clocked by DS synch pulses. The next DS pulse (DS–5) therefore shifts this flop from reset to set condition, and the Read Enable output terminal thereupon goes high.

This Read Enable signal is connected to an AND gate 258*a* (shown at the left-hand edge of control register stage A) together with the Drum Counter A signal. Thus, immediately after DS–5 pulse, gate 258*a* opens and its high output primes a pair of AND gates 260*a* and 262*a* which control the transmission of drum data from leads 220 and 222 to the first bit storage flop 188*a*. Gate 258*a* also primes corresponding pairs of gates 264*a*, 266*a*; 268*a*, 270*a*; and 272*a*, 274*a* controlling the other storage flops 190*a*–194*a*.

Simultaneously, i.e., immediately after the DS–5 pulse and during the next bit 1 time, AND gates 204 and 212 are opened to transmit the corresponding Drum Info and (Drum Info)′ signals to leads 220 and 222, and thence through AND gates 260*a* and 262*a* to the set and reset terminals, respectively, of the first bit storage flop 188*a*. This flop also is clocked by DS synch pulses, and thus will be activated at the next DS pulse, i.e., DS–6. If at this time the Drum Info signal is high, flop 188*a* will be conditioned to its set state. Alternatively, if the (Drum Info)′ signal is high, flop 188*a* will be conditioned to its reset state.

During the succeeding bit 2 time, AND gates 204 and 212 close, and AND gates 206 and 214 open to transmit the next drum bit through lead 224 (or 226) and gate 264*a* (or 266*a*) to the second bit storage flop 190*a*. Thus, at the end of this bit 2 time, i.e., at DS–7, flop 190*a* will be conditioned in accordance with whether the corresponding drum bit is a "logical one" or a "logical zero." Similarly, storage flops 192*a* and 194*a* are conditioned (filled) at the ends of the next succeeding bit 4 time and bit 8 times respectively.

The Bit 8 Time signal also is applied to an AND gate 276 (shown at the upper left-hand edge of control register stage A) which already is primed by the Read Enable signal (from flop 256) and the Drum Counter A signal. Consequently, gate 276 opens to transmit a high signal to the set input terminal of the "A" Filled From Drum control flop 198*a*. This flop is clocked by DS synch pulses so that when the next pulse arrives (DS–9), it is placed in its set condition and its A-Filled output goes high while its (A-Filled)′ output goes low. This signifies that the A stage of the synchronizing register 162 now contains a stored decimal digit which it received from the drum 18.

Reverting for the moment to the Enable Flop 250, the set input to this flop also is connected to a Step Drum Address line (SDA) which controls the conventional "add-one" circuit 136 associated with the slot register 108 (FIGURE 4). When the "compare" line went high after DS–2, the SDA line also went high and activated the add-one circuit 136 to increase by one digit, the number (slot address) stored in register 108. Consequently, at the next succeeding bit 2 time, the number generated by the counter 168 will equal the new number stored in the slot register, and as a result the compare line again will go high to start the read-out of another digit from the drum.

Returning now to the A stage of the synchronizing register 162, which has been filled with a decimal digit from the drum 18, the A-Filled output from control flop 198*a* is fed to AND gate 278 (shown to the right of Core Counter 238) together with the Core Counter A signal and the (high) "read" line. This opens gate 278 and its high output is transmitted through an OR gate 280 to another AND gate 282 having as additional inputs the Execute line and a control lead 284 which remains high (as will be explained) until the drum read-out operation is completed. Thus AND gate 282 opens to prime a BID flop 286 which also is controlled by $T_2$ clock pulses.

On the next succeeding $T_2$ clock pulse, i.e. $T_{2-3}$ as shown in the timing diagram of FIGURE 6, the BID flop is shifted to its set condition and produces a high output on the bid line 288 which leads (see FIGURE 4*c*) to one input terminal 290 of a priority selector circuit generally indicated at 292.

The other input terminals 294, 296, 298 etc. of the priority selector circuit are connected, respectively, to the corresponding BID flops of the other peripheral equipments (not shown) of the processing equipment. The peripheral equipment connected to terminal 294 has the highest priority, the drum sub-system connected to terminal 290 has the next highest priority, the equipment connected to terminal 296 has the next highest priority, etc. For example, the highest priority input terminal 294 may be connected to the BID flop of a magnetic tape unit.

Assuming that the line connected to input terminal 294 is low, indicating that the corresponding equipment is not bidding for access to the central processor, it will be evident that priority selector output terminal 300 will be low. Input terminal 294 also is connected to an inverter 302 the high output of which is directed to an AND gate 304 having a second input line 306 connected to the input terminal 290. Thus, the high bid signal on terminal 290 (from the drum sub-system) causes output terminal 308 (ALLOW) to go high.

The ALLOW signal is fed from output terminal 308 to the set input of an ALLOW flop 310, and also is connected through inverter 312 to the reset input of this flop. (The other output terminals 300, 314 and 316 similarly are connected to corresponding ALLOW flops not shown.) ALLOW flop 310 is controlled by the $T_0$ clock pulses so that, at the next pulse ($T_{0-4}$), this flop is set and its output line 318 goes high to initiate the transfer of the data stored in synchronizing register stage A to the magnetic core unit 14.

All of the priority selector input terminals 290, 294, 296 and 298 are connected to an inverting OR gate 320, the output of which is fed to an inverting AND gate 322. Thus, when the BID signal from BID flop 286 arrives at terminal 290, the output of OR gate 320 goes low and, assuming the other control leads 324 and 326 of AND gate 322 also are low, the output of this gate goes high. This high output is fed to the set input of an INTERRUPT flop 328 and, through an inverter 330 to the reset input of this flop. Thus, at the time of the $T_0$ clock pulse which sets ALLOW flop 310 (as previously described), the INTERRUPT flop also is set and produces on lead 332 a high "INTERRUPT" signal which is transmitted to the central processor to stop the operation of its Cycle Control and Function Table 48. Thus the processor is conditioned to receive the digit of data stored in the synchronizing register stage A.

At the same time, the high output of the ALLOW flop 310 opens an AND gate 334 to permit the transmission therethrough of the core addressing instructions stored in the core address register 112. This address data is transmitted along line 336 and through an OR gate 338 to the address selector 38 associated with the processor core 14. The instructions thus transmitted set up the addressing circuitry for the decimal digit to be transferred at this time from the synchronizing register stage A to the core storage.

The output of the ALLOW flop also (see FIGURE 7*c*) activates the conventional "add-one" circuit 142 which operates to increase by one the address number stored in the core address register 112 upon the occurrence of the next $T_0$ clock pulse, gated by the ALLOW flop signal in gate circuit 143. Thus, the core address register is reconditioned to define the address for the next succeeding digit to be transferred from the synchronizing register 162 to the processor core 14.

The ALLOW signal (i.e. the set input to the ALLOW flop 310) is transmitted along a line 340 to the Core Counter 238 to prime this counter for another step at the next succeeding $T_0$ clock pulse. When this next pulse ($T_{0-4}$) arrives, the Core Counter A signal goes low and the Core Counter B signal goes high. As shown in the timing diagram, this occurs at the same instant that the output of the ALLOW flop goes high.

The Core Counter B signal serves to open the output lines of register stage A to permit transfer of the stored data to the processor core 14. For this purpose, Core Counter B is fed to a series of AND gates **342*a*–348*a* each having an additional input line connected to the set output terminal of a respective one of the stage A bit storage flops 188*a*–194*a*. Therefore, when the Core Counter B signal goes high, the data stored in these storage flops is transmitted (in parallel form) through the corresponding AND gates and a cable 350 to an OR circuit generally indicated at 352. This latter circuit is of conventional construction and serves to produce on its four output lines 354–360 the corresponding bits of data which previously had been stored in stage A of the synchronizing register. These output lines are connected through another cable 362 back to the processor core 14, and the data bits on each line are stored in the core at locations identified by the address signals defined by the address selector 38, now under control of the core address register 112 of the drum control register 102**.

Referring now to the control flops of register stage A, the output of the ALLOW flop 310 is connected together with the Core Counter B signal to an AND gate 364 the output of which is fed to the set input of the A-Emptied control flop **196*a*. Thus, at the next $T_0$ pulse ($T_{0-5}$) this flop is conditioned to its set state, and its set output 366 goes high. This set output is connected to an AND gate 368 which already is primed by the "read" line, and the output of which is directed to the reset input of the A-Filled control flop 198*a*. Accordingly, at the next DS synch pulse (DS–15) this flop is shifted to its reset state and its reset output (A-Filled)′ goes high. This latter output is connected to the input of an AND gate 370 which already is primed by the "read" line, and the output of which is fed to the reset input of the A-Emptied control flop 196*a*. Consequently, this latter flop reverts to its reset state at the next $T_0$ pulse ($T_{0-6}$). Therefore, these control flops 196*a* and 198*a* are now both reset, indicating that the register stage A is empty and is ready to receive another digit of data from the drum 18**.

In the meantime, the register stage B has been filled with the next succeeding digit read off the drum 18. This transfer to stage B is accomplished in a manner identical to that described above with reference to stage A. In summary, at the occurrence of drum synch pulse DS–6, the "compare" line goes high, as previously mentioned, and at the next succeeding bit 8 time (i.e. after DS–8, the Read Enable flop is supplied with a high signal to its set input, so that this flop is maintained in set condition at the next DS pulse (DS–9). The Read Enable output is combined with the Core Counter B signal (now high) by an AND gate 372 (shown at the left-hand edge of stage B) the output of which primes the bit storage flops **188*b*–194*b* of the register stage B. Therefore these flops will receive the Drum Info or (Drum Info)′ signals at the corresponding bit 1, bit 2, bit 4 and bit 8 times following synch pulse DS–9. Subsequently, when the Core Counter C signal goes high, the data stored in stage B is transferred through AND gates 374*b*–380*b*, logical OR circuit 352, and cable 362 back to the processor core memory 14**. Synchronizing register stages C and D operate in a similar manner, and therefore no detailed discussion of these stages will be given herein.

If, during the read-out of data from the drum 18 as described above, a peripheral equipment having higher priority than the drum transmits a BID signal to the priority selector circuit 292 (FIGURE 4*a*), this other peripheral equipment will obtain access to the processor core memory 14 and the read-out from the drum sub-system will be halted until this higher priority operation has been completed. Such a situation is shown on the timing diagram of FIGURE 6, wherein a higher priority BID signal is shown going high at $T_{2-6}$, and lasting for one core cycle until $T_{2-7}$. The Core Counter C signal previously had gone high, indicating that register stage C is the next in sequence from which a digit is to be transferred to the core memory, and the C-Filled From Drum control flop **198*c* had been set (at DS–17) so that its C-Filled output is high. Therefore, at pulse $T_{2-6}$ the drum sub-system BID flop 286** also develops a BID signal, i.e. at the same time as the higher priority BID shown on the timing diagram.

Referring now to the priority selector circuit 292, with the higher priority BID signal applied to input terminal 294, it will be evident that the output of the inverter 302 will be low and thereby close gate 304 so that the drum BID signal on input terminal 290 cannot be transmitted through to its output terminal 308. Therefore, the ALLOW flop 310, which was reset at $T_{0-6}$, cannot be set at the next $T_0$ pulse, ($T_{0-7}$). Also, the core counter 238 remains at its stage C setting, with Core Counter C signal high. Accordingly, there can be no read-out from stage C of the synchronizing register, since such read-out takes place only when the Core Counter D signal goes high.

When the higher priority BID signal goes low at $T_{2-7}$, the ALLOW signal on the priority selector output terminal 308 goes high. The ALLOW flop 310 is set at the next $T_0$ clock pulse ($T_{0-8}$), and this clock pulse also advances Core Counter 238 to stage D. Therefore, the Core Counter D signal goes high to open the output AND gates of register stage C and transfer the digit stored therein to the core memory 14. The operation of the drum sub-system thereafter continues in the manner described previously.

It has previously been mentioned that the number stored in the slot register 108 must be increased by one each time a digit is read out from drum 18 into the synchronizing register 162. It will be evident that for this purpose the slot register flops must be clocked with the drum synch pulses (DS), whereas while the original instruction data is being shifted into the slot register from the processor, the slot register flops must be clocked by the processor lock pulses ($T_0$). Although this alternative clock control is a relatively straight-forward operation, FIGURE 7*a* has been included to show details of the gate circuit 138 used for this purpose.

Referring now to FIGURE 7*a*, when the drum control register 102 is receiving instructions from the central processor, the high Shift signal is fed to an AND gate 382 together with $T_0$ clock pulses. The output of this AND gate passes through an OR gate 384 to energize a clock control line 386 connected to the clock inputs of the twelve slot register flops. Only a typical one of these flops 388 is shown in FIGURE 7*a*, but it will be understood that the other flops of the slot register are similarly controlled.

The set output of the previous slot flop 390 immediately preceding the flop 388 (see also FIGURE 4*b*) is connected to an AND gate 392 together with the Shift signal (now high), and the output of this AND gate is fed through an OR gate 394 to the set input terminal of the slot flop 388. The reset input of this latter flop is energized from the set input through an inverter 396, in the same manner as the flops of the state and head registers 104 and 106. Therefore, upon the occurrence of a $T_0$ clock pulse at the AND gate 382, the flop 388 is activated to receive the data bit from the preceding flop 390, and in this manner the instruction digits are transferred from stage to stage until all thirteen digits have been stored in their proper locations in the control register 102.

During the subsequent data retrieval operation, the Shift signal is low, and therefore the slot register flops do not receive any clock pulses from AND gate 382, nor do they receive any data bits from preceding flops (as through AND gate 392). However, each time a digit is retrieved from the drum 18, it is necessary to change the number stored in the slot register 108 to the next higher digit, and thus at least some of the slot register flops must be changed from set to reset, or vice versa. To trigger this "add one" operation, a Step Drum Address signal (SDA) is produced at the input of Enable Flop 250, and fed to an AND gate 398 in the gate circuits 138, together with the drum synch pulses (DS) and the Bit 8 Time signal. Accordingly, at the drum synch pulse immediately succeeding the next Bit 8 Time signal, the output of AND gate 398 goes high to transmit a signal through OR gate 384 and clock control line 386 to the clock inputs of all of the slot register flops.

In the meantime, the SDA signal also has been applied to an AND gate 400 in the "Add-One" and Shift Circuits 136, to open this latter gate for the transmission of the control signal from the conventional add-one circuitry (not shown). This control signal is fed through OR gate 394 to the typical slot flop 388 shown in FIGURE 7*a*, to condition this flop for the new number to be stored in the slot register. It will be understood, of course, that all of the slot register flops are controlled by corresponding circuitry so that each time the SDA signal goes high, the states of the various slot register flops are altered as necessary to correspond to a number that is one digit higher than previously stored therein.

The field register 110 is originally filled by the central processor with a number corresponding to the number of digits to be retrieved from the drum 18. Each time a digit of data is transferred from the synchronizing register 162 back to the process core memory 14, the number stored in the field register is reduced by one digit, by means of a conventional "subtract-one" circuit indicated by the block 140. For this purpose, the subtract-one circuit is triggered (see also FIGURE 7*b*) by the ALLOW signal developed on the output terminal 308 of the priority selector circuit 292, and the ALLOW signal also gates on the $T_0$ clock pulses. Thus, whenever the ALLOW signal is high, the subtract one circuit operates to reduce the stored number by one upon each occurrence of a $T_0$ clock pulse.

The signals representing the digital number stored in the field register 110 are transmitted along a cable 402 to a decoder 404 which is arranged to produce a high output signal from line 406 ("length-equals-zero") whenever the signals coming from the field register correspond to the number zero. This indicates that all of the digits to be retrieved from the drum 18 have been transferred back to the central processor. This length-equals-zero signal is transmitted along line 406 to an AND gate 408 having as its other input the Execute line from the Execute flop 146. Since this Execute line is high during the data retrieval operation, the output of AND gate 408 goes high, and this signal is fed to the set input of a Stop Flop 410. This flop is clocked by $T_2$ clock pulses, so that when the next $T_2$ pulse occurs, it is conditioned to its set state.

The length-equals-zero signal (high) on line 406 also is fed to an inverter 412, the resulting low output of which is transmitted along line 284 to AND gate 282, thereby closing this AND gate. The output of AND gate 282 is applied to an inverter 414 to produce a high signal which passes through an AND gate 416 to the reset input terminal of the BID flop 286. Accordingly, upon the next $T_2$ clock pulse, the BID flop is placed in its reset state, i.e. at the same time that the Stop flop 410 is set.

The set output of Stop flop 140 is fed to the reset input of the Execute flop 146. Therefore, at the next succeeding $T_0$ pulse, the Execute flop is reset, and the Execute signal goes low while the (Execute)′ signal goes high. With the Execute signal low, AND gate 246 is closed, and thereafter the Enable flop 250 and the Read Enable Flop 256 are reset. Accordingly, no further transfers of data to or from the drum 18 can take place.

With the Execute signal being low, AND gate 408 is closed and a low signal thus is applied to the set input of the Stop flop 410. Also, the (Execute)′ signal, now high, is applied to the reset input of this flop. Consequently, at the next $T_2$ clock pulse, the Stop flop is reset, thereby conditioning the drum sub-system for a further data transfer operation upon receipt of another Execute signal and Compare signal.

*The flip-flop circuit*

FIGURE 8 shows the schematic diagram of a preferred form of flip-flop unit used in the system described hereinabove. This flip-flop includes set and reset input terminals 420 and 422, set and reset output terminals 424 and 426, and a clock input terminal 428. The flip-flop is in its "set" state when output terminal 424 is −3.8 volts referred to ground, and output terminal 426 is at ground potential. The flip-flop is reset when terminal 424 is at ground potential and terminal 426 at −3.8 volts.

The operation of the flip-flop circuit can readily be deduced by those skilled in the art, but a brief description will be given as an aid to understanding this operation. Fundamentally, the flip-flop comprises a bistable multivibrator formed by transistors 430 and 432 together with associated circuit elements. The trigger signals for this multivibrator pass through a gating stage including diodes 434 and 436, and the multivibrator output signals are buffered by additional transistors 438 and 440. The clock input circuit is adapted to receive negative clock pulses, and an inverter transistor 442 is provided to convert to positive pulses. The reset input circuit also includes an inverter 444 (e.g. equivalent to inverter 134 in the state register 104, FIGURE 4). Thus the reset input terminal 422 can be connected to the set input terminal 420 to permit the flip-flop to be controlled by the "high" or "low" signals on a single control lead.

When the flip-flop is in its "set" condition, transistor 432 is "on" and transistor 430 is "off," and vice versa for the "reset" condition. Back-bias circuits are provided for both of the gate diodes 434 and 436 to normally prevent the passage therethrough of positive clock pulses from inverter 442. Diode 434 is back-biased when the set input terminal is −3.8 volts, and diode 436 is back-biased when the reset input terminal is at ground potential (since in that case inverter transistor 444 is cut off and its collector is clamped to −3.8 v.).

To trigger the flip-flop from set to reset, the potential of reset input 422 is changed to −3.8 volts. This turns on transistor 444, the collector of which goes to ground potential. Thereby, the back bias on gate diode 436 is reduced sufficiently that the next clock pulse from inverter 442 will pass through diode 436 and trigger the base of transistor 432. This turns transistor 432 off, and the negative-going voltage at the collector of this transistor is coupled via the usual RC circuit to the base of the other transistor 430, so as to turn the latter on. The flip-flop is now reset.

The flip-flop is changed from reset to set by applying ground potential to the set input 420 (and, of course, also changing the reset input 422 from −3.8 to ground). This reduces the back bias on gate diode 434, and allows the next clock pulse to pass through to the base of transistor 430. Thus this transistor is turned off, and at the same time the other transistor 432 is turned on. The flip-flop also is adapted to be switched back and forth without the timing of the clock pulses; this is accomplished by applying ground potential to termnials 446 or 448 which directly applies positive voltage to the respective multivibrator transistor 430 or 432.

Although a preferred embodiment of the invention has been set forth in detail, it is desired to emphasize that this is not intended to be exhaustive or necessarily limitative; on the contrary, the showing herein is for the purpose of illustrating the invention and thus to enable others skilled in the art to adapt the invention in such ways as meet the requirements of particular applications, it being understood that various modifiications may be made without departing from the scope of the invention as limited by the prior art.

We claim:

1. In a data processing system which includes a central processing unit operating at one speed and at least one peripheral unit operating at a different speed independent of the operating speed of said processing unit, apparatus for effecting the transfer of data between said two units comprising, in combination, a series of storage devices each having an input and an output and adapted to receive and store one segment of said data; a first control circuit carrying timing pulses synchronized with the operation of one of said units, first gating means operated by the timing pulses of said first control circuit for transferring segments of said data from said one unit to said storage devices, said gating means including means to gate said inputs of said storage devices in a predetermined sequential order to store each data segment in a respective storage device as the data segments are developed serially by said one unit; a second control circuit carrying timing pulses synchronized with the operation of the other of said units, second gating means operated by the timing pulses of said second control circuit for opening said outputs of said storage devices in said predetermined sequential order and transferring the data segments from said storage devices to said other unit, serially.

2. Apparatus for synchronously transferring data between a central processor unit operating at a first fixed speed and a peripheral unit operating at a second fixed speed independent of the operating speed of said processor unit, said apparatus comprising a plurality of register stages each capable of storing one decimal digit, a plurality of control devices each associated with one of said register stages to indicate whether the corresponding stage is conditioned to receive or transfer a digit of data, first gate circuit means synchronized with the operation of one of said units for sequentially coupling the inputs of said register stages to said one unit to receive the data therefrom, first control circuit means responsive to the state of said control devices for activating said gate circuit means only when the next register stage in sequence is conditioned to receive a digit of data, second gate circuit means synchronized with the operation of the other one of said units for sequentially coupling the outputs of said register stages to said other unit to transfer the stored data to said other unit, and second control circuit means responsive to the state of said control devices for activating said second gate circuit means only when at least one of said register stages is conditioned to transfer a digit of data to said other unit.

3. Apparatus as set forth in claim 2, wherein each of said register stages comprises a group of flip-flops adapted to store a bit of data, said first gate circuit means including means to sequentially open the inputs of the individual flip-flops in each group to accommodate the receipt of the data in serial form.

4. Apparatus as claimed in claim 3, wherein said second gate circuit means includes means to open the outputs of each group of flip-flops simultaneously, and thereby transfer the stored data to said other unit in parallel form.

References Cited by the Examiner

UNITED STATES PATENTS

| | | | |
|---|---|---|---|
| 2,813,929 | 11/1957 | Oberman | 179—18 |
| 2,951,233 | 8/1960 | Tanco et al. | 340—172.5 |
| 2,985,865 | 5/1961 | Merz | 340—172.5 |
| 2,988,735 | 6/1961 | Everett et al. | 340—172.5 X |
| 2,995,729 | 8/1961 | Steele | 340—172.5 |
| 3,026,036 | 3/1962 | Haanstra et al. | 235—157 |
| 3,029,414 | 4/1962 | Schrimpf | 340—172.5 |
| 3,945,217 | 7/1962 | Housman et al. | 340—172.5 |

ROBERT C. BAILEY, *Primary Examiner.*

MALCOLM A. MORRISON, *Examiner.*

P. J. HENON, P. L. BERGER, *Assistant Examiners.*